(12) United States Patent
Gill et al.

(10) Patent No.: US 11,024,272 B2
(45) Date of Patent: Jun. 1, 2021

(54) GRAPHICAL INTERFACE FOR SELECTING A MUSICAL DRUM KIT ON AN ELECTRONIC DRUM MODULE

(71) Applicants: David C. Gill, Lincoln, RI (US); Walter P. Skorupski, Cranston, RI (US)

(72) Inventors: David C. Gill, Lincoln, RI (US); Walter P. Skorupski, Cranston, RI (US)

(73) Assignee: INMUSIC BRANDS, INC., Cumberland, RI (US)

( * ) Notice: Subject to any disclaimer, the term of this patent is extended or adjusted under 35 U.S.C. 154(b) by 0 days.

(21) Appl. No.: 16/478,707

(22) PCT Filed: Jan. 19, 2018

(86) PCT No.: PCT/US2018/014587
§ 371 (c)(1),
(2) Date: Jul. 17, 2019

(87) PCT Pub. No.: WO2018/136836
PCT Pub. Date: Jul. 26, 2018

(65) Prior Publication Data
US 2020/0051539 A1 Feb. 13, 2020

Related U.S. Application Data

(60) Provisional application No. 62/448,354, filed on Jan. 19, 2017.

(51) Int. Cl.
*G10H 1/32* (2006.01)
*G10H 1/00* (2006.01)
(Continued)

(52) U.S. Cl.
CPC ....... *G10H 1/0008* (2013.01); *G06F 9/30003* (2013.01); *G06F 12/0802* (2013.01);
(Continued)

(58) Field of Classification Search
CPC ...... G10H 3/12; G10H 3/14; G10H 2220/106; G10H 2230/281; G10H 1/368; G10H 1/36;
(Continued)

(56) References Cited

U.S. PATENT DOCUMENTS

2001/0008100 A1* 7/2001 Devecka ............... A63F 13/005
84/738
2002/0162445 A1* 11/2002 Naples .................. G10H 1/365
84/610

(Continued)

*Primary Examiner* — Marlon T Fletcher
(74) *Attorney, Agent, or Firm* — Burns & Levinson LLP.

(57) ABSTRACT

An electronic-drum module for connection to one or more electronic-drum pads is provided. The module includes an electronic display, a memory storing audio files for playback when the playback is triggered by a signal received from a pad, and one or more processors coupled to the electronic display and the memory. The processors are configured to play the audio files when the playback is triggered and display, on the display, a user interface for an application. The user interface for the application includes a list of available trigger sources. The processors are also configured to receive an instruction to select an available trigger source and display, on the display, a list of available drum kits to associate with the available trigger source. The processors are also configured to display images of the available drum kits in response to receiving an instruction to select an available drum kit.

9 Claims, 25 Drawing Sheets

(51) Int. Cl.
    *G09G 5/02*     (2006.01)
    *G06F 12/0862*     (2016.01)
    *G10H 1/36*     (2006.01)
    *G10H 3/14*     (2006.01)
    *G10H 7/02*     (2006.01)
    *G06F 9/30*     (2018.01)
    *G06F 12/0802*     (2016.01)
    *G10D 13/10*     (2020.01)
    *G10D 13/02*     (2020.01)

(52) U.S. Cl.
    CPC ........... *G06F 12/0862* (2013.01); *G09G 5/02* (2013.01); *G10D 13/02* (2013.01); *G10D 13/26* (2020.02); *G10H 1/0066* (2013.01); *G10H 1/32* (2013.01); *G10H 1/36* (2013.01); *G10H 1/361* (2013.01); *G10H 1/368* (2013.01); *G10H 3/146* (2013.01); *G10H 7/02* (2013.01); *G09G 2320/0666* (2013.01); *G09G 2320/0686* (2013.01); *G10H 2220/00* (2013.01); *G10H 2220/091* (2013.01); *G10H 2220/106* (2013.01); *G10H 2220/116* (2013.01); *G10H 2230/281* (2013.01); *G10H 2250/641* (2013.01)

(58) Field of Classification Search
    CPC ............... G10H 1/18; G10H 2230/275; G10H 2220/101; G10H 1/32; G10H 2240/145; G10H 2210/361; G10H 2220/046; G10H 2230/305; G10H 2220/111; G10H 2210/071; G10H 2210/341; G10H 2220/081; G10H 2230/325; G10H 2230/291

See application file for complete search history.

(56) References Cited

U.S. PATENT DOCUMENTS

| | | | |
|---|---|---|---|
| 2004/0199491 A1* | 10/2004 | Bhatt | G06F 16/40 |
| 2004/0199494 A1* | 10/2004 | Bhatt | G06F 16/40 |
| 2009/0304207 A1* | 12/2009 | Cooper | G10H 1/08 |
| | | | 381/119 |
| 2010/0319519 A1* | 12/2010 | Takehisa | G10H 3/146 |
| | | | 84/723 |
| 2012/0006182 A1* | 1/2012 | Komano | G10H 1/42 |
| | | | 84/610 |
| 2012/0204704 A1* | 8/2012 | Shim | G10H 1/0066 |
| | | | 84/645 |
| 2014/0090545 A1* | 4/2014 | Cooper | G10H 1/08 |
| | | | 84/625 |
| 2019/0103085 A1* | 4/2019 | Decker | G06F 3/04847 |
| 2019/0371288 A1* | 12/2019 | Gill | G06F 12/0862 |
| 2020/0174755 A1* | 6/2020 | Rose | H04N 21/8541 |
| 2020/0174757 A1* | 6/2020 | Rose | G06F 8/34 |
| 2020/0251079 A1* | 8/2020 | Gill | G10H 1/0008 |

* cited by examiner

| KIT | Funkalicious | TRIG | Snare | | |
|---|---|---|---|---|---|
| LAYER A | | | VELOCITY TO | | PLAYBACK MODE |
| Dog_Barking_Down_A_Sewer_Drain | | | LEVEL FILTER DECAY PITCH | | POLY |
| VEL LIMIT 27 | | 127 | | | |
| LAYER B | | | VELOCITY TO | | PLAYBACK MODE |
| Snare_large_14_kit | | | LEVEL FILTER DECAY PITCH | | POLY |
| VEL LIMIT 0 | | 27 | | | |
| LEVEL | TONE | OTHER | | BROWSE | BACK |

FIG. 7B

| KIT | Funkalicious | TRIG | Snare | | |
|---|---|---|---|---|---|
| LAYER A | | | TRANSPOSE | FINE TUNE | FILTER CUTOFF | FILTER TYPE |
| Dog_Barking_Down_A_Sewer_Drain | | | ◎ 0 | ◎ 0 | ◎ 0 | LOPASS |
| VEL LIMIT 27 ▮▮▮▮▮ 127 | | | | | | |
| LAYER B | | | TRANSPOSE | FINE TUNE | FILTER CUTOFF | FILTER TYPE |
| Snare_large_14_kit | | | ◎ 0 | ◎ 0 | ◎ 0 | HIPASS |
| VEL LIMIT 0 ▮▮ 27 | | | | | | |
| LEVEL | TONE | OTHER | BROWSE | | BACK |

720 ⟶ (LAYER A group)
710 ⟶ (LAYER B group)

GRAPHICAL INTERFACE FOR SELECTING A MUSICAL DRUM KIT ON AN ELECTRONIC DRUM MODULE

PRIORITY CLAIM

This application is a national stage application under 35 U.S.C. § 371 of international application number PCT/US2018/014587, filed Jan. 19, 2018, which designated the U.S. and claims priority under 35 U.S.C. § 119 to U.S. Provisional Patent Application No. 62/448,354, which was filed on Jan. 19, 2017, and are incorporated herein by reference in their entirety.

TECHNICAL FIELD

The present disclosure relates generally to systems and methods for generating a graphical interface for selecting a musical drum kit on an electronic drum module.

BACKGROUND

Musicians use electronic percussion instruments (e.g., electronic drums) to create one or more sounds or sound data by generating an electrical signal. The electrical-signal generation may be initiated by, for example, striking a playing surface, such as a drum-head surface. The drum-head surface may be coupled to an electromechanical transducer that generates electrical signals in response to vibrations, and this electromechanical transducer may, upon sensing vibrations effectuated by the strike, generate a corresponding electrical signal. The signal may be transmitted to an external system (e.g., an electronic-drum module) for processing. Such processing may comprise analyzing the electrical signal to determine details about the sound to be played or generated. The processing may comprise, for example, determining what sound-sample should be played back upon detecting an electrical signal, at what time to play the sound-sample and/or with what volume, when to end playback of the sound sample, etc. Once analyzed, the electrical signal may be used to generate sound or sound data consistent with the analysis or to playback a prerecorded sound consistent with the analysis. Some of this analysis, generation, and/or playback may depend on user selections or other settings on the electronic-drum module. For example, a user may make various selections on an electronic-drum module connected to a transducer within an electronic snare drumpad. The user may select a "car-effects" drum-kit on the module and select a "large-hall" reverberation setting. In this example, if the user gently taps the electronic snare drum's drum-head, the electrical signal produced by the transducer may trigger the module to generate or play an analog audio signal of a car horn at a quiet volume, within a fixed period after the user's strike, and reverberating for a long time. Because the user selected a "car-effects" drum-kit on the module, the module will produce analog sound signals of car effects when it receives triggering signals from electronic drum pads connected thereto.

The disclosed systems and methods are directed to overcoming one or more of the problems set forth above and/or other problems or shortcomings in the prior art.

BRIEF DESCRIPTION OF THE DRAWINGS

The accompanying drawings, which are incorporated in and constitute a part of this specification, illustrate the disclosed embodiments and, together with the description, serve to explain the principles of the various aspects of the disclosed embodiments. In the drawings:

FIGS. 7A-7C illustrate exemplary displays.

Figure 1:
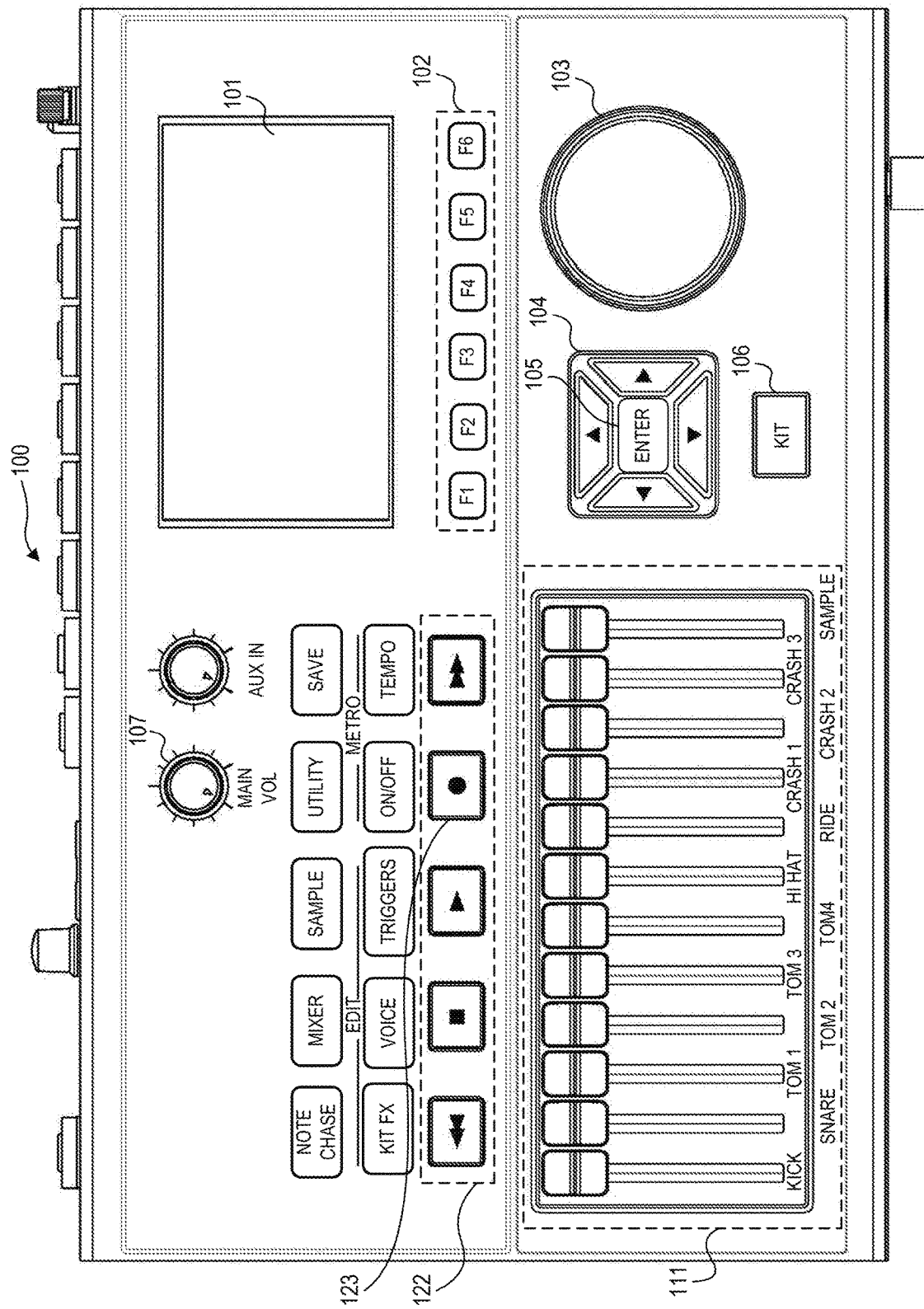
FIG. 1 illustrates an exemplary electronic-drum module.

It is to be understood that both the foregoing general descriptions and the following detailed descriptions are exemplary and explanatory only and are not restrictive of the claims.

DESCRIPTION OF EXEMPLARY EMBODIMENTS

Many electronic drum pads may be connected to a single module at once. In this case, a drum kit selected on the module and other user settings on the module will dictate what sound signals will be generated or played in response to triggers from the respective electronic drum pads. In a "car effects" example, an electrical signal from the snare drum may trigger the module to generate an audio signal of car horn, whereas an electrical signal from the crash cymbal may trigger the module to generate an audio signal of a car crash. The selection of a particular drum kit may result in very different sounds being generated when the module is triggered by strikes on different drum pads. In some embodiments, the module may also generate only slightly different sounds when the module is triggered by the same drum pad. For example, if a user strikes the center of a drum-pad head, the amplitude of the vibrations, the frequency of the vibrations, and/or the frequency of vibration-amplitude peaks picked up by a transducer may be larger than if the user struck the edge of a drum-head. This may be the case if the transducer is in contact with the drum-head at its center rather than its edge. With such a hit on the center of the drum-head, the electrical signal produced may be high (e.g., high DC-voltage, high amplitude AC-voltage, etc.). The high electrical signal may indicate to the module that the audio signal generated or played should be of a loud sound. Alternatively, if the user strikes the edge of the drum-head and the electrical signal produced is low (e.g., low DC-voltage, low amplitude AC-voltage, etc.), the module may generate an audio signal of a quiet sound. Therefore, different types of strikes on the drum-head require the generation of different audio signals.

The audio signals, rather than being generated by the module, may instead be playbacks of prerecorded audio files (e.g., "samples"). This may alleviate the module from the processor-intensive task of synthesizing audio signals. In such case, a selected drum kit may comprise audio files. In some embodiments, a selected drum kit may comprise audio files and/or data instructing the system how to playback audio files (e.g., audio parameters specifying what effects or processing to perform on audio files before they are played back). Since different types of strikes on the drum-head require the playback of different audio files, it is advantageous for the module to have access to many different files for a given drum kit. Even if two drum-strikes on the same electronic-drum's drumhead produce identical or nearly identical electrical signals for triggering the module, the module may still play back two slightly different audio files in order to replicate two realistic, human-initiated drum strikes. Doing so may be especially advantageous when trying to replicate the sound of an acoustic drum-kit with an electronic drum and external module. The human ear is sensitive to the fact that a human cannot strike an acoustic drum twice with the exact same force; two strikes of an acoustic drum must create two different sounds, no matter how minute the difference. Playing back the exact same audio file for multiple electronic-drum strikes (e.g., in fast succession), may be perceived as computer-generated and lacking the natural imperfection inherent in a human acoustic-instrument performance. Therefore, it is desirable to maximize the number of audio files the user may access through the module and to have a system for navigating and selecting the drum kits and the audio files therein. It is further desirable for such system to comprise a display on which information, menus, selections, and parameters may be viewed by the user while interacting with the system. Such system and display may be tailored the requirements of drummers, who may perform in environments with many distractions and with poor lighting conditions.

The disclosed systems and methods are directed to overcoming one or more of the problems set forth above and/or other problems or shortcomings in the prior art.

Reference will now be made to certain embodiments consistent with the present disclosure, examples of which are illustrated in the accompanying drawings. Wherever possible, the same reference numbers will be used throughout the drawings to refer to same or like parts.

The present disclosure describes systems and methods for generating a graphical interface for selecting a musical drum kit on an electronic drum module.

FIG. 1 shows one illustrative embodiment of an electronic-drum module at 100 (i.e., module 100). Module 100 may include a display 101. Display 101 may show information relevant to module's 100 current operation. Display 101 may be full-color, monochromatic, or greyscale. Display 101 may be a multi-touch display. In certain embodiments, module 100 may recognize touch gestures performed on display 101. Display 101 and/or other hardware controls may be used to control module 100. Other hardware controls, such as, for example, buttons, knobs, wheels, or faders may be used to make selection from display 101. For example, in certain embodiments, and enter-button 105 may be pressed to select a highlighted element or parameter shown on display 101. A cursor button from the plurality of cursor-buttons 104 may be used to adjust which element or parameter is highlighted. A wheel 103 may be used to adjust a selected element or parameter. For example, rotating wheel 103 counter-clockwise may decrease a parameter's value and rotating wheel 103 clockwise may increase a parameter's value. In certain embodiments, wheel 103 may be pressed to select a highlighted element or parameter shown on display 101. Use of wheel 103, in certain embodiments, may facilitate faster and more intuitive selections or other operations within module's 100 user interface than, for example, a keyboard and mouse often used with desktop or laptop computers. Use of wheel 103 may facilitate faster and more intuitive use by musicians in high-energy performance settings that may, in some circumstances, have poor lighting conditions. A standard computer keyboard's layout may have many buttons that are small compared to the size of the wheel. Wheel 103 may have an internal resistance built in (e.g., friction) such that rotating wheel 103 requires an application of force. The internal resistance may be built in so the chance of accidental rotation is reduced. The standard computer mouse, which operates largely in vertical and horizontal motions, may offer little resistance to accidental movement.

Figure 2:
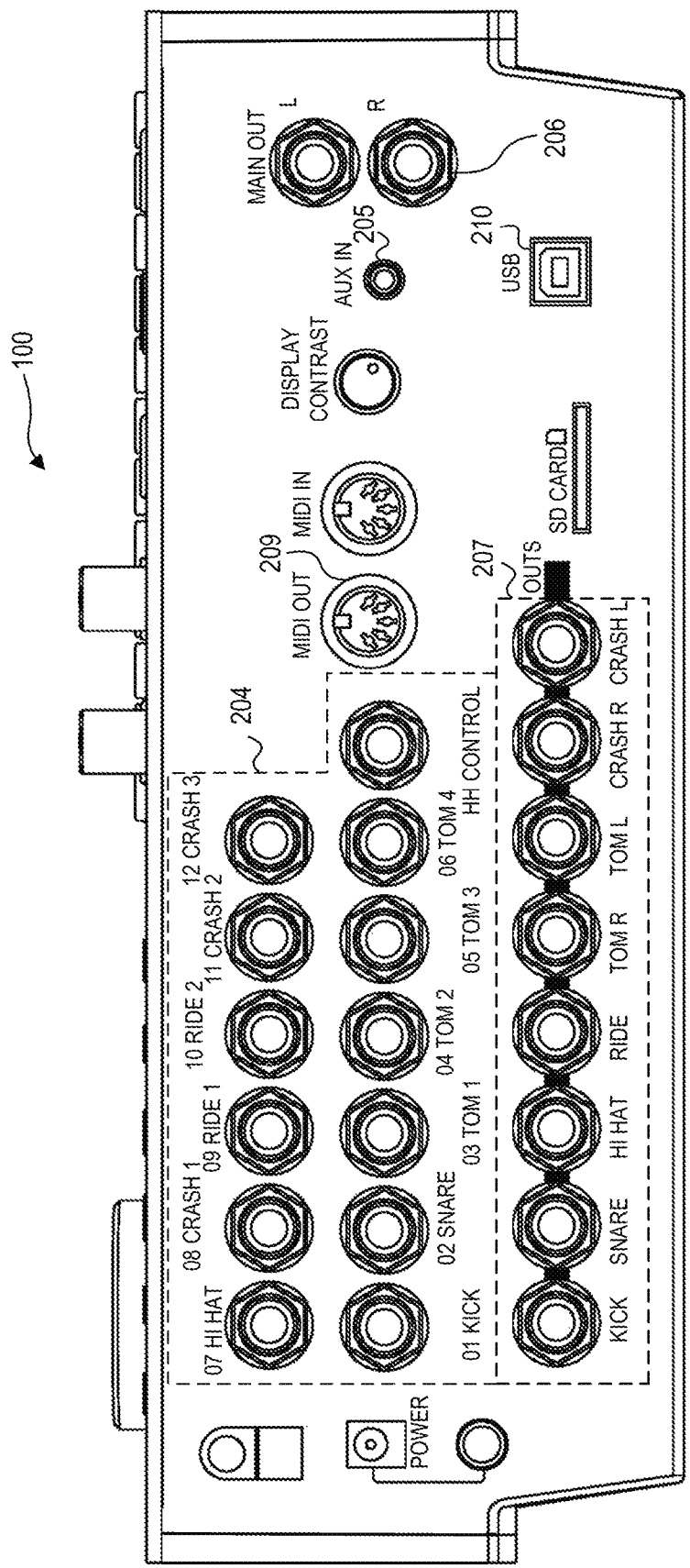
FIG. 2 illustrates a side view of the exemplary electronic-drum module.
Figure 3:
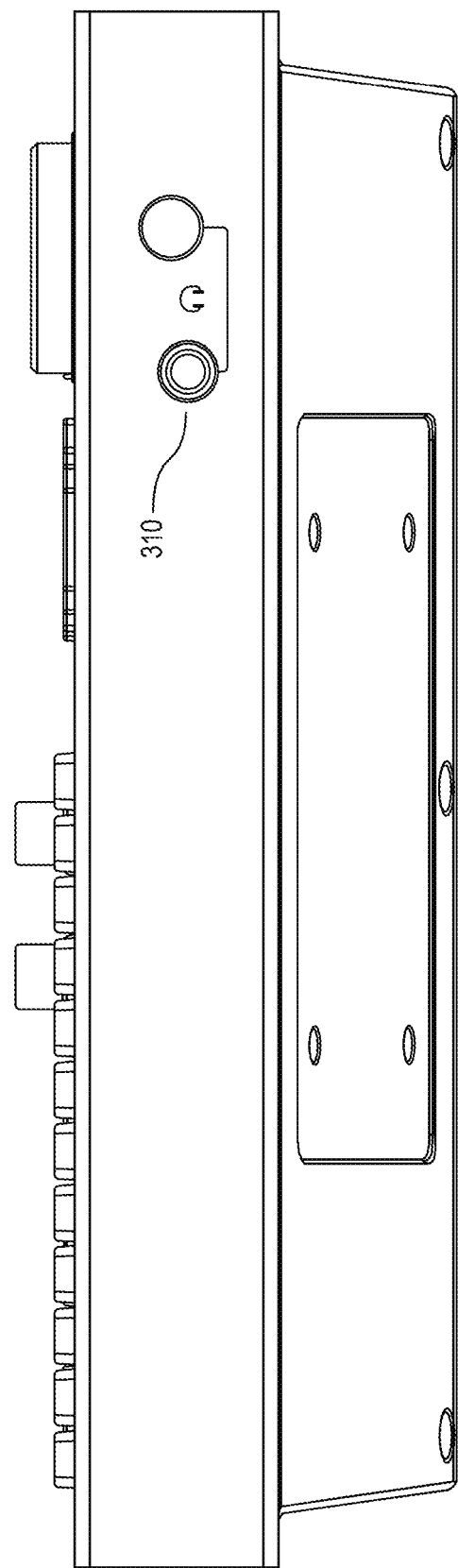
FIG. 3 illustrates another side view of the exemplary electronic-drum module.

A plurality of electronic drum pads may be connected to module 100. For example, electronic drum pads may be connected using one-quarter-inch tip-ring-sleeve cables to a plurality of exemplary pad-input jacks 204, shown in a first exemplary side-view of module 100 illustrated in FIG. 2. In some embodiments, input jacks 204 may be combined into one or more jacks for receiving one or more plugs (e.g., a 37-pin D-Sub connector, or "DB37" connector). Electronic drum pads, as referred to herein, may include at least one of electronic drum pads, cymbal pads, or high-hat pads. In certain embodiments, one or more tip-ring-sleeve cables may carry strike signals from multiple zones of a drum pad. For example, a tip-ring-sleeve cable may carry a rim-strike signal, a center-strike signal, and a ground connection from a snare-drum pad. In an embodiment, a tip-ring-sleeve cable may carry a bow-strike signal and an edge-contact signal. The strike and contact signals may be referred to as "triggers" and may indicate, among other things, the time at which a particular sound or sounds should and/or should not be played and the volume at which the sound or sounds should be played (e.g., the velocity). One or more drum pads may have at least one sensor that senses when a user strikes the drum in a particular area or, in the case of a cymbal, grabs the cymbal's edge or, in the case of a high-hat, closes the high-hat. The area of the drum most directly coupled to a given sensor may be referred to as a zone. For example, a snare drum pad may have a sensor near the rim and a sensor near the center, creating a rim zone and a center zone. When module 100 receives a strike signal from a particular zone's sensor, such as through pad-input jacks 204, module 100 may generate and/or play a sound. With reference to the first exemplary side-view of module 100 illustrated in FIG. 2, the sound may be outputted through output-jacks 207, main-output jacks 206, USB-jack 210, and/or MIDI-OUT jack 209, and/or through exemplary headphone-jack 310 shown in the second exemplary side-view of module 100 illustrated in FIG. 3. The output through one or more output jacks of output-jacks 207 of FIG. 2 may be individually controlled using output-faders 111, illustrated in FIG. 1, or may be fixed. One or more fader of output-faders 111 may control the volume output of at least one sound through at least one jack of main-output jacks 206 of FIG. 2. For example, the left-most fader of output-faders 111 of FIG. 1 may by slid up or down to increase or decrease the volume, respectively, of the sound signal output through main-output jacks 206 of FIG. 2. Output-faders 111 may be slide potentiometers. Main-volume knob 107 of FIG. 1 may be rotated counter-clockwise and clockwise to decrease or increase the volume of the sound signal outputted through main-output jacks 206 of FIG. 2. The sound signal outputted through main-output jacks 206 may be a mixed signal or signals of sounds triggered with drum pads.

Figure 4:
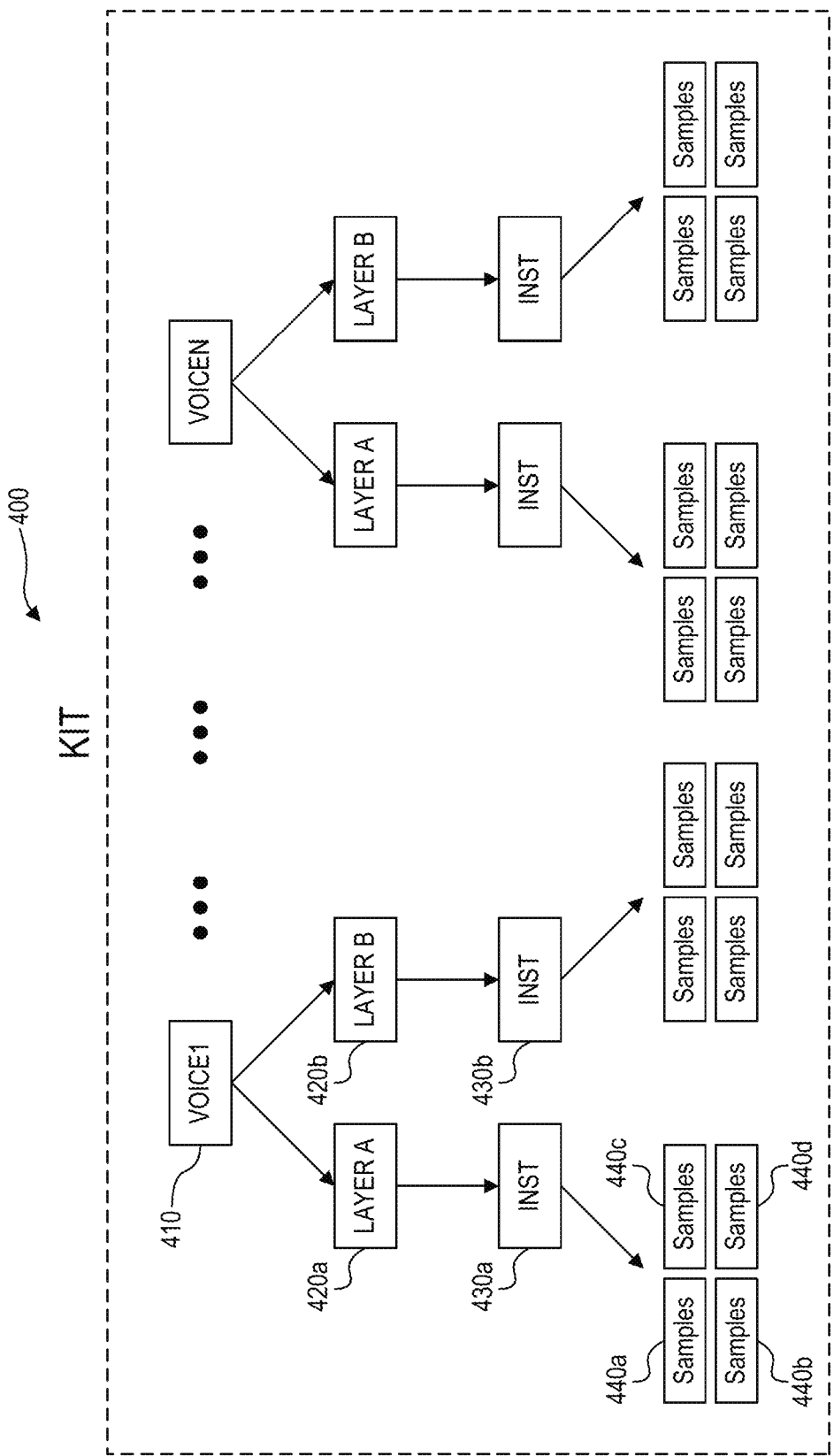
FIG. 4 illustrates an exemplary kit.

When module 100 receives a trigger from a drum pad, module 100 may access a sound stored internally or externally in a kit data structure (i.e., kit) or generated according to information in a kit. In certain embodiments, a user may specify a kit from which to select sounds for playback when the user strikes one or more drum pads. An exemplary kit 400 is illustrated in FIG. 4. Kit 400 may be a data structure comprising other data structures. Kit 400 may comprise one or more voices such as exemplary voice 410. Voice 410 may be assigned or associated with a zone in a drum pad. Voice 410 may comprise one or more layer, such as exemplary layers 420a and 420b. Layers 420a and 420b may comprise one or more instruments, such as exemplary instruments 430a and 430b, respectively. An instrument may comprise data for generating one or more sounds or for playing one or more pre-recorded samples (i.e., samples). Layer 420a may comprise one or more instruments and one or more samples, such as exemplary samples 440a, 440b, 440c, and 440d. Since voice 410 may comprise a plurality of layers, such as layers 420a and 420b, striking a single zone in a drum pad may signal module 100 to output a plurality of sounds. Similarly, since instruments 430a and 430b may comprise more than one sample, more than one sample may be played simultaneously with every trigger associated with the voice and/or played in succession with every subsequent trigger received. For example, striking a snare-drum center zone five times may result in five different samples being played one after the other or may result in five samples being played simultaneously. Playing the different samples one after the other may be done to simulate the imperfections inherent in a human acoustic-instrument performance. The simulation may be achieved by, for example, making at least some of the samples (e.g., such as samples associated with a particular strike velocity) slightly different from one another. These slight differences may include slight fluctuations in volume, tonal quality, phase, attack, decay, sustain, release, etc., between two or more strikes.

Figure 5:
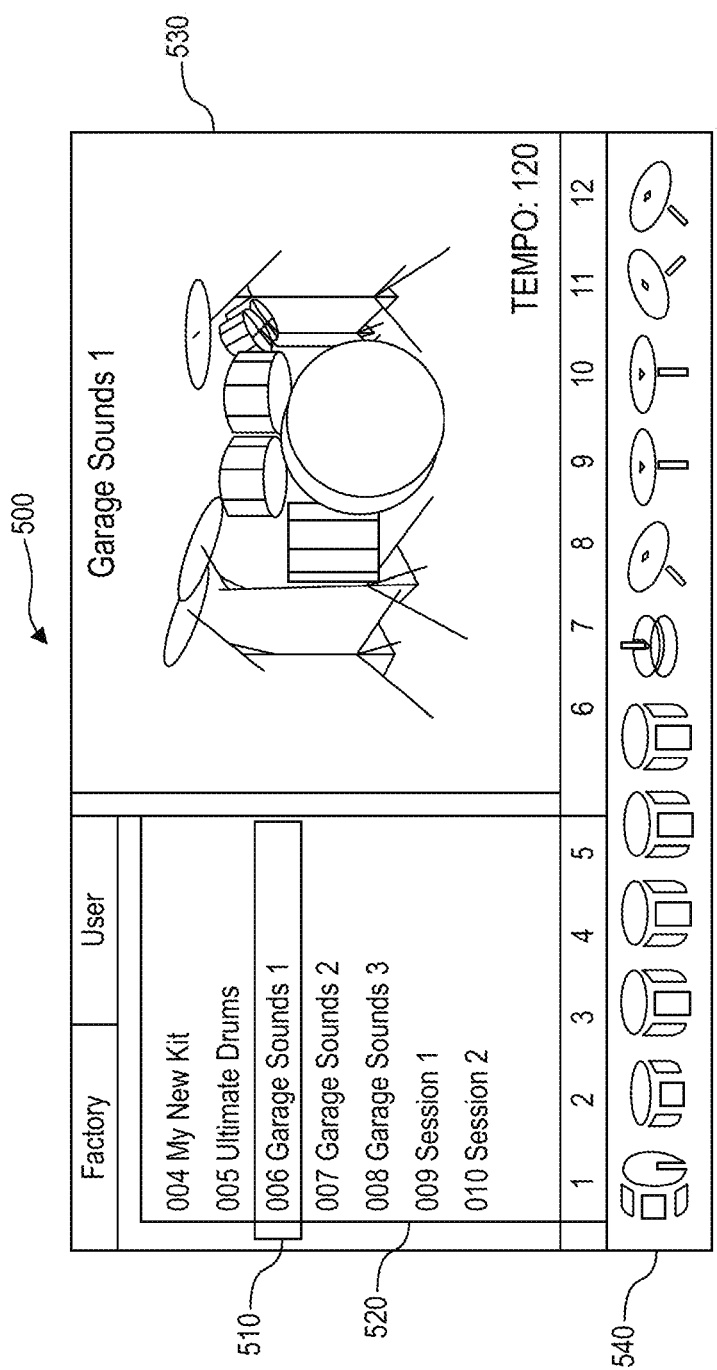
FIG. 5 illustrates an exemplary kit display.
Figure 6:
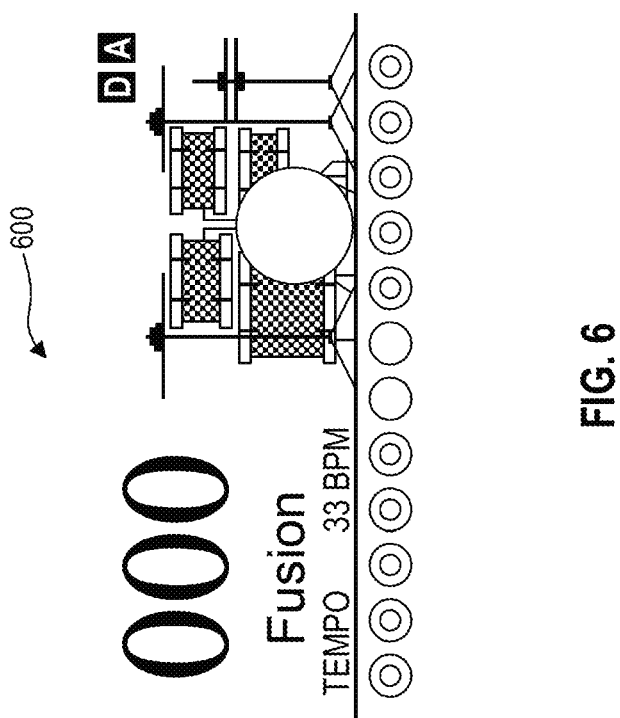
FIG. 6 illustrates an exemplary kit image.
Figure 20:
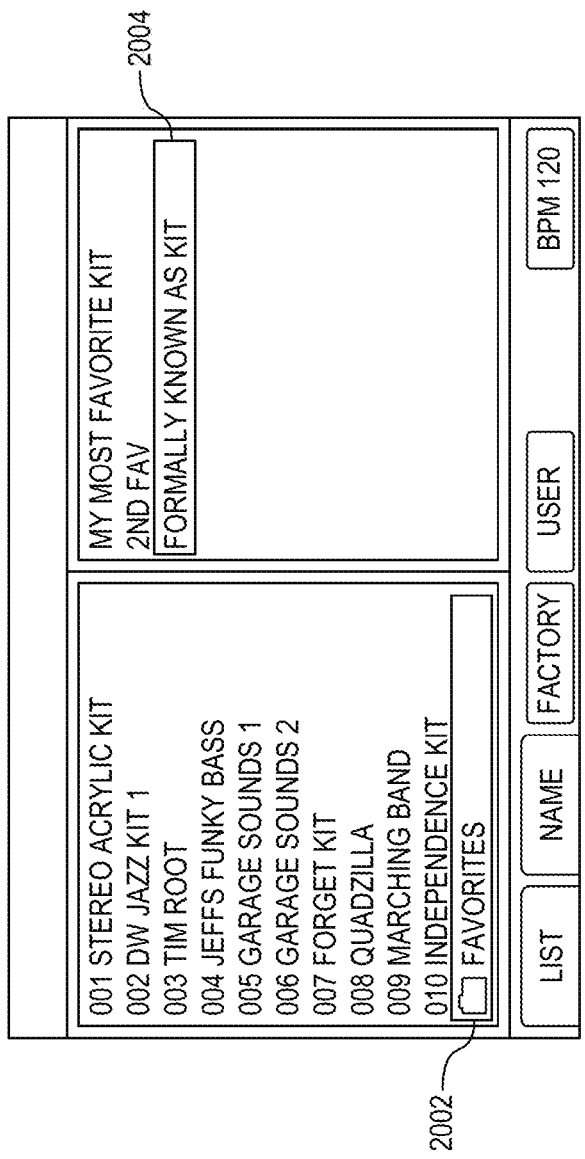
FIG. 20 illustrates an exemplary folder-selection view.

A user may select which sample should be outputted when a particular zone in a particular drum pad is struck. In certain embodiments, the user may do so by, among other things, selecting a kit, selecting one or more instruments for one or more layers, and selecting one or more sounds or samples for the one or more selected instruments. For example, a user may press kit-button 106 of FIG. 1 and be displayed a list of available kits, such in exemplary kit-display 500 illustrated in FIG. 5. A user may scroll the highlighted selection bar 510 through a list of available kits 520 using, for example, wheel 103 of FIG. 1. As the user highlights a particular kit, an image of the highlighted kit, such as exemplary kit-image 530 of FIG. 5, may be shown on display 101 of FIG. 1. In some embodiments, a user may select a folder instead of or in addition to a drum kit. FIG. 20 illustrates an exemplary folder-selection view that may be displayed on display 101. An exemplary folder 2002 may be selected and a list of drum kits in the folder, such as exemplary drum kit 2004, may be displayed. In some embodiments, an image of a highlighted kit may be displayed even when the kit is located within a selected folder. Kit-image 530 of FIG. 5 may provide sufficient detail to distinguish the highlighted kit from other available kits. For example, providing sufficient detail may comprise displaying the drum kit such that a user may discern at least one of the relative size of drums in the drum kit, the number and/or types of cymbals available in the drum kit, the number and/or types of drums available in the drum kit, the type of wood the drum kit is made from, or the relative position of drums and cymbals within the drum kit. This stands in contrast to exemplary kit-image 600 illustrated in FIG. 6, which may lack sufficient detail to distinguish it from other kits. Displaying kit image 530 may aid a user in quickly identifying a highlighted kit and determine whether to select the kit based on its visualized appearance because it has sufficient detail to distinguish it from other kits. This may be advantageous to a musician trying to select a kit while performing in a fast-paced, high-energy setting with, in some cases, poor lighting conditions, rendering reading difficult. This may be advantageous if the musician is a drummer and moving their head while pressing a bass-drum or high-hat pedal or striking a drum and attempting to select a kit. Kit image 530 may be a custom image created or provided by the user. The user may select a highlighted kit by, for example, pressing enter-button 105 of FIG. 1. The user may highlight a particular trigger-source to which a sound is to be assigned, such as exemplary trigger-source 540 of FIG. 5, by, for example, pressing one or more cursor buttons of cursor-buttons 104 of FIG. 1 until the desired trigger-source is highlighted. The user may select the highlighted trigger-source by, for example, pressing enter-button 105. In certain embodiments, in addition to or instead of selecting a highlighted trigger-source by, for example, pressing enter-button 105, a user may select a trigger-source by striking the drum zone coupled to the sensor to which the user wants to assign a sound or edit the sounds assigned thereto. The highlighting and/or selection of the kit may be performed by wheel 103 or other controls on module 100. Doing so with wheel 103 or other controls on module 100 may be more convenient than with a computer keyboard because standard computer keyboard's layout may have relatively many buttons that are small compared to the size of wheel 103 or other controls on module 100. Adjusting the highlighting or selection with wheel 103 rather than a computer mouse may be more convenient for a musician because the standard computer mouse, which operates largely in vertical and horizontal motions, may offer little resistance to accidental movement, whereas wheel 103 may have an internal resistance built in (e.g., friction) such that rotating wheel 103 requires an application of enough force so that the chance of accidental rotation is reduced. Use of wheel 103 may facilitate faster and more intuitive use by musicians in high-energy performance settings that may, in some circumstances, have poor lighting conditions that make it hard to read a keyboard or find a mouse. Allowing a user to have electronic-drum pads connected to the unit on which the drum kit will be selected, such as module 100, may allow the user to select the drum kit and start triggering it with the electronic-drum pads in less time and in fewer steps than if the user were required to first select the drum kit on a computer and then transfer the selection to the unit that will be connected to the electronic-drum pads. Facilitating the selection of the drum kit on module 100 instead of on a computer may decrease the number of devices needed by a musician, reducing transportation, storage, and capital investment expenses in equipment. For example, module 100 may be a single self-contained unit, whereas a computer system for selecting the drum kit may comprise multiple units (e.g., computer case, display monitor, keyboard, mouse, and/or speakers). If a computer system for selecting a drum kit is used, data of the selection may then need to be transferred to a module for, among other things, interfacing with the electronic-drum pads, which may require two pieces of equipment (e.g., the computer system and module), extra time and, potentially, system resources to transfer data of the selection.

Figure 7A:
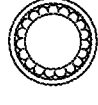
Figure 8:
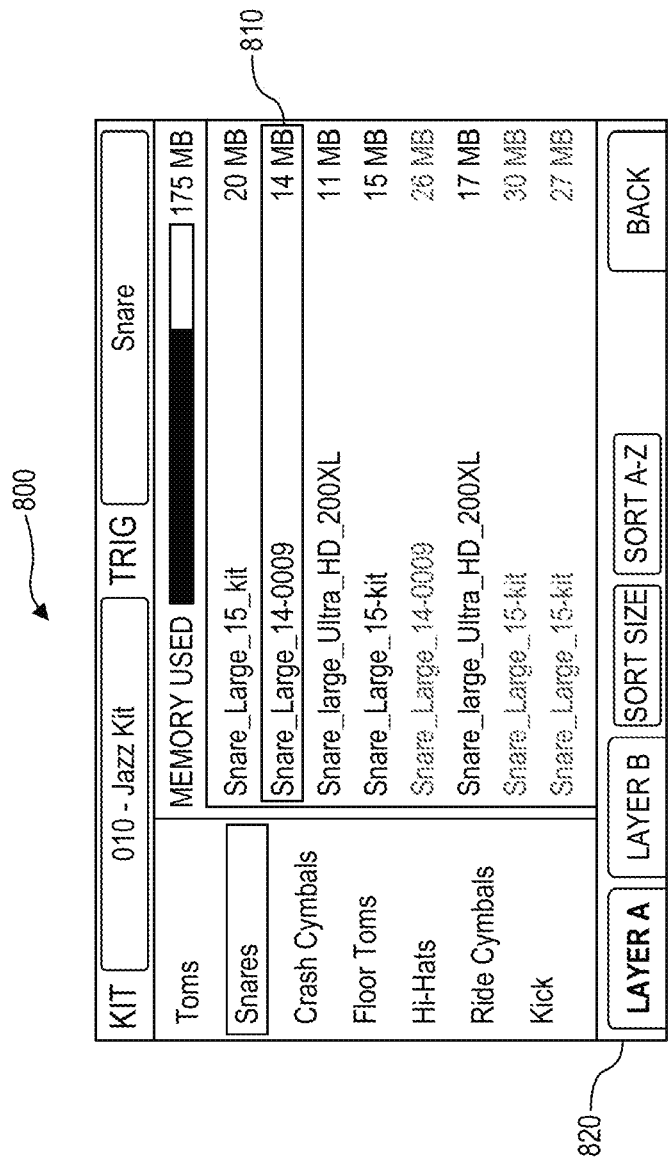
FIG. 8 illustrates another exemplary display.

Display 101 of FIG. 1 may present the user with various displays for selecting and editing the sounds associated with the selected trigger-source, such as exemplary displays illustrated in FIGS. 7A, 7B, and 7C. The user may use one or more of cursor-buttons 104, enter-button 105, or wheel 103 of FIG. 1 to highlight and select the instrument for a particular layer, such as instrument 710 of FIG. 7C in Layer-B 720. The user may rotate wheel 103 of FIG. 1 to scroll through available instruments. In an exemplary embodiment, display 101 may present the user with exemplary display 800, illustrated in FIG. 8, for selecting an instrument 810 and associating it with layer 820.

When a user scrolls through available instruments for a particular layer or through a list of kits, the user may hear what sounds would be played if the instrument displayed or kit highlighted were selected and a drum-pad's zone struck (e.g., to audition the kit or instrument). To do this, the user may scroll to a kit or instrument and strike a drum-pad zone before making the selection. In certain embodiments, merely scrolling to the kit is sufficient to select it. Even in this case, the user may want to strike a pad to hear which kit they have selected before starting a performance or playing a song. Data pertaining to one or more kits may be stored on memory that can transfer data to a processor quickly (e.g., RAM and/or Flash memory) relative to other types of memory (e.g., SD Card, USB drive, hard disk, and/or solid state drive). The former memory may be referred to as "fast memory" and the latter as "slow memory." Because a kit may comprise numerous samples, and because samples may be audio files of varying sizes, data pertaining to the kit may take up a lot of memory. In certain embodiments, kits with more samples may take up more memory. Because fast memory may be more expensive per unit of storage than slow memory, some portion of fast memory may be allocated to hold data pertaining to a currently selected drum kit rather than data pertaining to all kits. The data pertaining to multiple kits may be stored on slow memory, such as an SD Card, and, upon selection of a particular kit, the selected kit may be transferred to a fast memory, such as RAM. Doing so may create one or more advantages particular to the functionality of electronic-drum modules. For example, if a portion of the module's RAM is used to store only the selected kit instead of multiple kits, more RAM memory is available for storing the selected kit. This allows each individual kit take up more memory than would be possible if more than the selected kit was stored in the portion of the module's RAM because the portion would be shared between the selected kit and other data or kits. Allowing each individual kit to take up more memory allows kits to comprise more and/or better quality samples. More samples in a single kit may be advantageous because using more samples may facilitate simulating more realistically the inherent imperfections of a human acoustic-instrument performance. The simulation may be achieved by, for example, making at least some of the samples (e.g., such as samples associated with a particular strike velocity) slightly different from one another. These slight differences may include slight fluctuations in volume, tonal quality, phase, attack, decay, sustain, release, etc., for between two or more strikes. More samples per kit may also be advantageous because it may allow for samples for more strike velocities (e.g., volumes) to be stored in a single kit. For example, the kit may contain samples covering 256 strike velocities rather than 128 strike velocities. Samples of better quality (e.g., those recorded with a higher sample rate and/or with a higher bit-depth) may be advantageous because they may facilitate a better audio-quality performance. Another advantage of storing data pertaining to multiple kits in slow memory and transferring selected kit data to a fast memory is the ability to use large kit files in light of a microprocessor's or digital signal processor's inability to recognize an amount of fast memory (e.g., RAM) necessary to store multiple large kit files in fast memory. Storing unused kit files in slow memory allows kit files to remain large.

Because transferring data pertaining to a selected kit between slow memory and fast memory takes time, owing in part to the slow nature of slow memory, data pertaining to a selected kit may be transferred in an order that minimizes the impact of the time-delay needed to make the transfer on the user's experience. For example, there may be priority instructions associated with one or more kits that instruct the processor to transfer one or more samples within a selected kit in the order in which they are likely to be used. For example, the sample that is more likely to be used first will be transferred first. This way, a user may not notice the delay because at least some of the samples are transferred by the time they are needed. In certain embodiments, where one or more samples produce very similar sounds but with slight variations (e.g., to simulate two successive hits by a human on an acoustic drum), only one or less than all such samples may be loaded before other samples. Such methods of transfer may improve the functionality of the aforementioned system for storing kits on slower memory and a selected kit in faster memory and the functionality of such system in the context of electronic-drum modules, owing in part to the use of samples in this context to realistically simulate the inherent imperfections of a human acoustic-instrument performance. The data pertaining to the selected kit may be transferred by storing instruction data associated with one or more kits that indicates what order to transfer the data in. The instruction data may comprise instructions to first transfer samples for a few most-used velocities for a given pad-zone rather than transfer all velocities for the pad-zone. For example, the instruction data may comprise instructions to first transfer a medium-volume sample for a snare drum and then transfer a low-volume and a high-volume sample. These instructions may be specific to a particular kit, such a Cocktail Jazz Kit. The instructions for a particular kit may be created based on the mostly likely use-case for that particular kit. For example, a user interested in the Jazz Kit may be expected to initially strike the drum pads with a medium force, as opposed to a user of a Heavy Metal kit who may be expected to initially strike the drum pads with a high force. In such example, because of the expected use-case for the kit, the Heavy Metal Kit may be stored with instructions to first load high-volume samples and then load low- and medium-volume samples. In certain embodiments, the instruction data may comprise instructions to first transfer samples pertaining to a few most-used pad-zones for a given kit rather than transfer all samples for all pad-zones for a given kit. For example, instruction data specific to a Dance/Techno Kit may instruct the system to first transfer bass-drum samples rather than snare-rim samples because a user interested in a Dance/Techno Kit may be expected to most likely strike the bass drum before the snare rim. In some embodiments, the most-used pad-zones may be determined by an association between a kit and a musical artist known for having a distinct sound when striking a particular drum. In certain embodiments, a set of instructions may pertain to more than one kit, such as kits for a particular genre of music. In certain embodiments, a set of instructions may pertain to all kits. In some embodiments, the instructions may be stored on a memory separate from that storing the kits data. The aforementioned methods of transferring samples may be performed on module 100 and/or on a general-purpose computer.

Figure 9A:
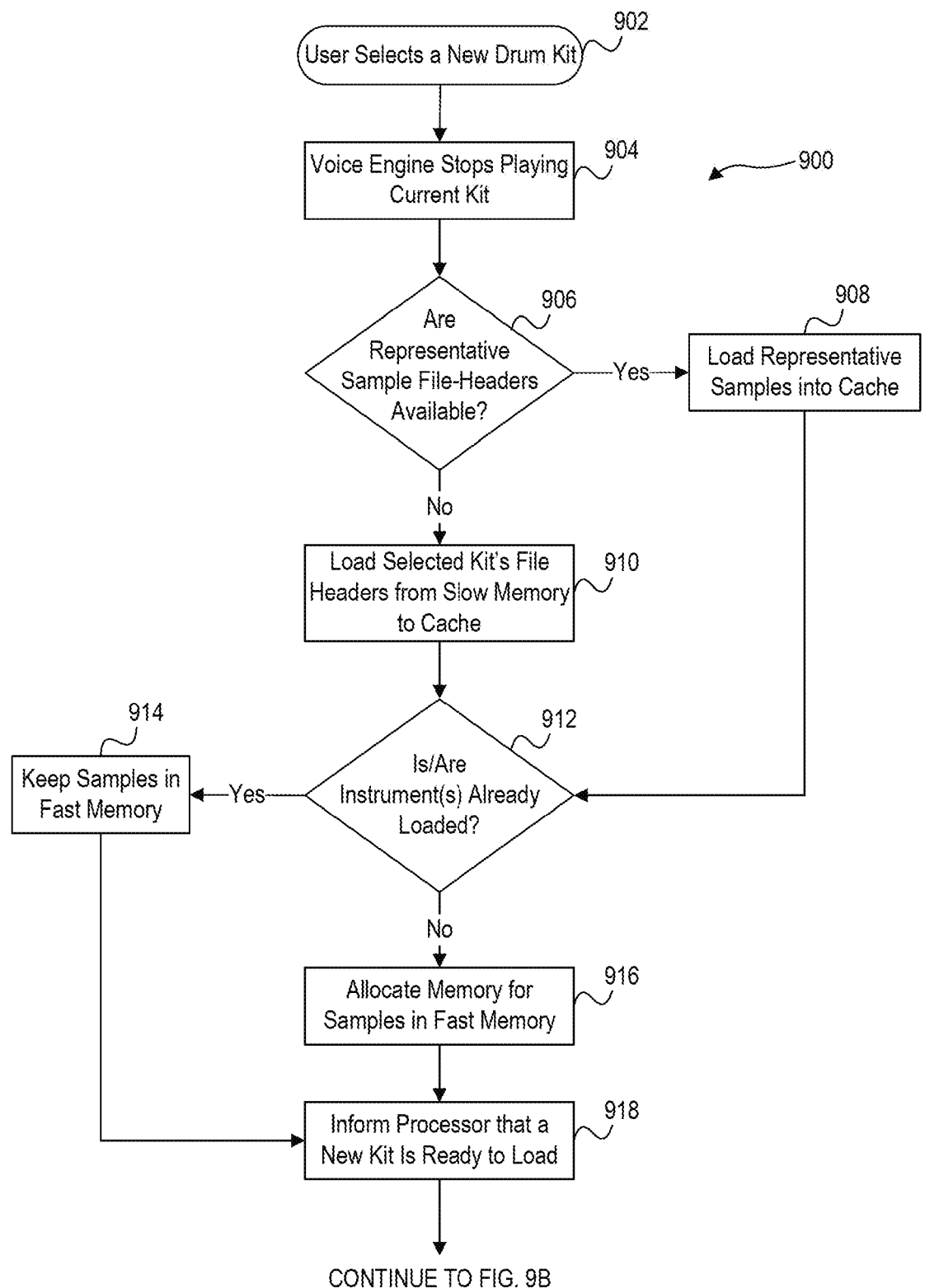
FIGS. 9A and 9B are a flow diagram illustrating an exemplary method.
Figure 9B:
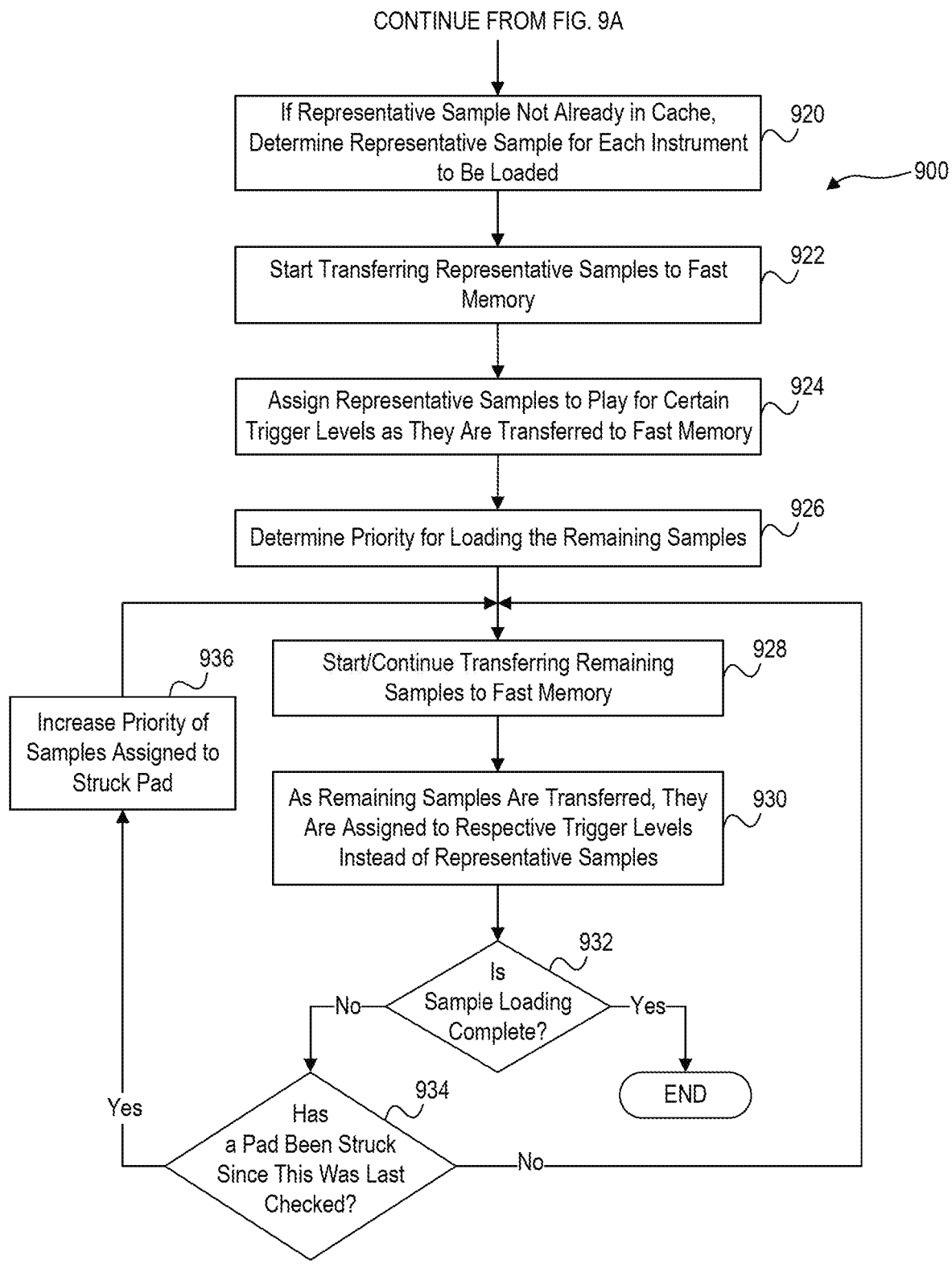

FIGS. 9A and 9B are a flow diagram illustrating an exemplary method 900 consistent with embodiments of the present disclosure. At step 902, a user may select a drum kit. Such selection may be made on module 100. In certain embodiments, the selection may be made using a device external to module 100. At step 904, a voice engine, such as a voice engine implemented on DSP CPU 1220, may stop playback of a samples associated with a currently loaded kit. This may occur because there is insufficient processing capacity to continue playback of sample associated with a currently loaded kit. In certain embodiments, such as when DSP CPU 1220 supports multiple voice engines, it may be unnecessary to stop playback of samples associated with a currently loaded kit. In such case, step 904 may be skipped. At step 906, the system may check whether representative samples and/or file headers for representative samples for the selected kit are available for loading into a fast memory. Such fast memory may be cache memory within DSP CPU 1220 and/or another portion of fast memory. In certain embodiments, the fast memory may be external to DSP CPU 1220. A file header for a sample, instrument, or kit may contain information pertaining to the sample, instrument, or kit. For example, the file header may specify how many strike force or velocity levels a given instrument has, where in memory particular samples may be located, the filenames of particular samples, priority-instructions indicating the order in which to transfer samples and/or how many different samples are assigned to the same strike force of velocity level for a given instrument. If representative samples and/or file headers for representative samples for the selected kit are available for loading into a fast memory, the representative samples may be loaded into the fast memory at step 908. In certain embodiments, the system may not check whether representative samples and/or file headers for representative samples for the selected kit are available for loading into fast memory. In such case, step 908 may be skipped. At step 910, the file header or headers for the selected kit may be transferred from slow memory to fast memory such as the cache within DSP CPU 1220. At step 912, the system may determine whether the samples from the instruments specified by the selected kit are already loaded into fast memory. Such determination may be made by, for example, reading identifiers for the instruments and/or samples from the file header or headers for the selected kit. If the samples from the instruments specified by the selected kit are already loaded into fast memory, at step 914, the system may keep the samples in fast memory and proceed to informing the processor, at step 918, that a new kit (e.g., parameters for sample playback such as tuning, envelope characteristics, effects, etc.) is ready for loading into fast memory. If at step 912 the system determines that some samples for the selected kit are not yet loaded, the system may allocate memory for the samples and/or parameters not yet loaded in a fast memory at step 916. In certain embodiments, the system may load samples regardless of whether they were already loaded. It is to be understood that, in some embodiments, cache and fast memory may be used or allocated interchangeably. In some embodiments the system may load none, some, or all samples to cache memory. In some embodiments, the system may load none, some, or all samples to another type or section of fast memory. For example, a header file or sound for a kit may be pre-loaded into cache or another portion of fast memory as a user scrolls through a list of kits and deleted if a user moves to another kit in their scrolling. Doing so may decrease the time necessary to load a full kit when selected. The system may then inform, at step 918, the processor that a new kit (e.g., parameters for sample playback) is ready for loading into fast memory.

FIG. 9B illustrates the continuation of exemplary method 900 consistent with embodiments of the present disclosure. At step 920, if representative samples were not yet loaded into a fast memory at step 908, the system may determine which samples to load as representative samples for the instruments associated with the selected kit. This determination may be made by, for example, referencing the file header or headers associated with the selected kit or the one or more instruments associated with the kit. The file header or headers may indicate which samples are the representative samples for the instrument being loaded. At step 922, the identified representative samples are transferred to fast memory. At step 924, the transferred representative samples are assigned to play when one or more drum pads is struck at one or more levels of force or velocity. For example, a representative sample for a snare drum may be assigned such that it is played when the snare drum-pad is struck with any velocity. In certain embodiments, two or more representative samples may be assigned, such as a low-force sample and a high-force sample to be played if the snare drum-pad is struck lightly or forcefully, respectively. In certain embodiments, two or more representative samples may be assigned such that the system plays them alternatingly when a particular drum pad is struck at one or more force or velocity levels. In certain embodiments, the non-representative samples may be loaded according to a particular priority. The priority is determined at step 926. The priority may be specified in the file header or headers associated with the instrument associated with the samples or the selected drum kit. The specification may be in the form of an instruction. In certain embodiments, the same priority may be specified for some or all drum kits. In some embodiments, a user may set this priority for drum kits pre-loaded on module 100 and/or for drum kits the user creates. At step 928, the non-representative samples begin being transferred to fast memory. At step 930, the non-representative samples may be assigned to drum pads and triggered by a user as soon as they are in the fast memory. In certain embodiments, the non-representative samples for a particular drum pad may be triggered after all non-representative samples for the drum pad are transferred. The non-representative samples may be assigned instead of the representative samples once the former are loaded into fast memory. At step 932, the system may check whether sample-loading is complete. If not, at step 934, the system may monitor for a drum pad being struck. Upon detecting a strike during sample loading, the system may, at step 936, increase the priority of the samples associated with the instrument associated with the struck drum pad. For example, the priority of the struck drum pad's samples may be set such that these samples are transferred first. If no pad was struck during loading since the check at step 934 was last completed, the sample-loading continues without modifying the priority. In certain embodiments, the system may transfer samples associated with a middle-level strike force or velocity for a particular drum pad and continue by transferring samples associated with increasingly higher-level strike force or velocity and decreasingly lower-lever strike force or velocity. In certain embodiments, another order of transferring samples may be used. All samples associated with a particular drum pad and a particular strike force or velocity may be transferred first or, in certain embodiments, one or more samples for one or more strike forces or velocity levels may be transferred before transferring other samples associated with one or more strike forces or velocity levels. If sample-transferring is determined to be complete at step 2636, method 2600 may end.

Figure 10:
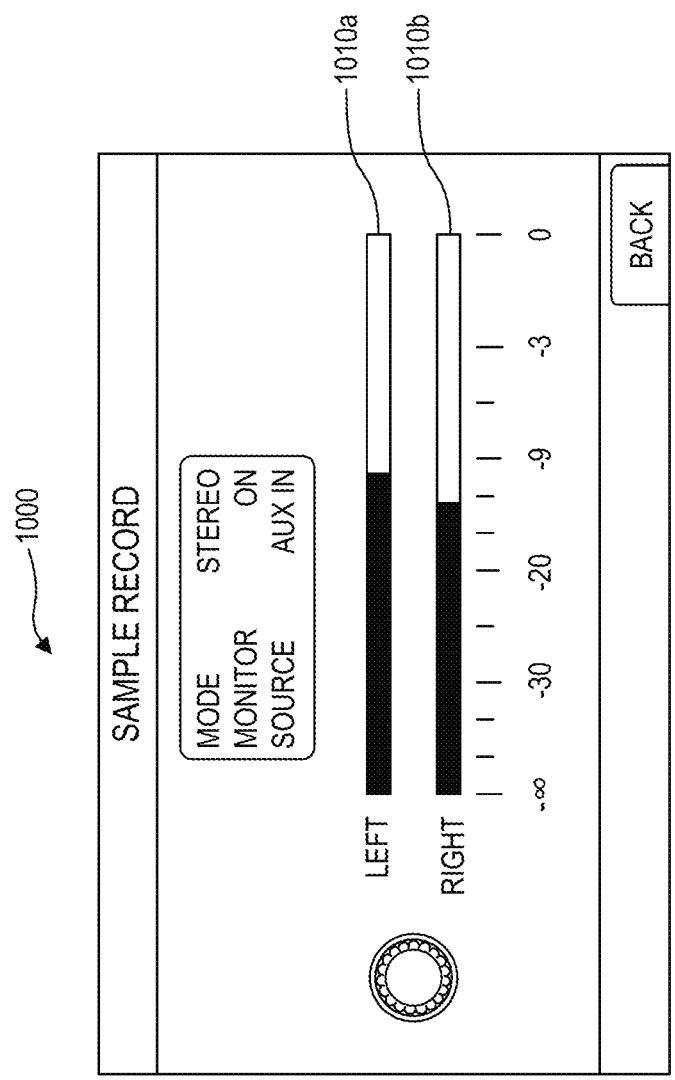
FIG. 10 illustrates another exemplary display.
Figure 11A:
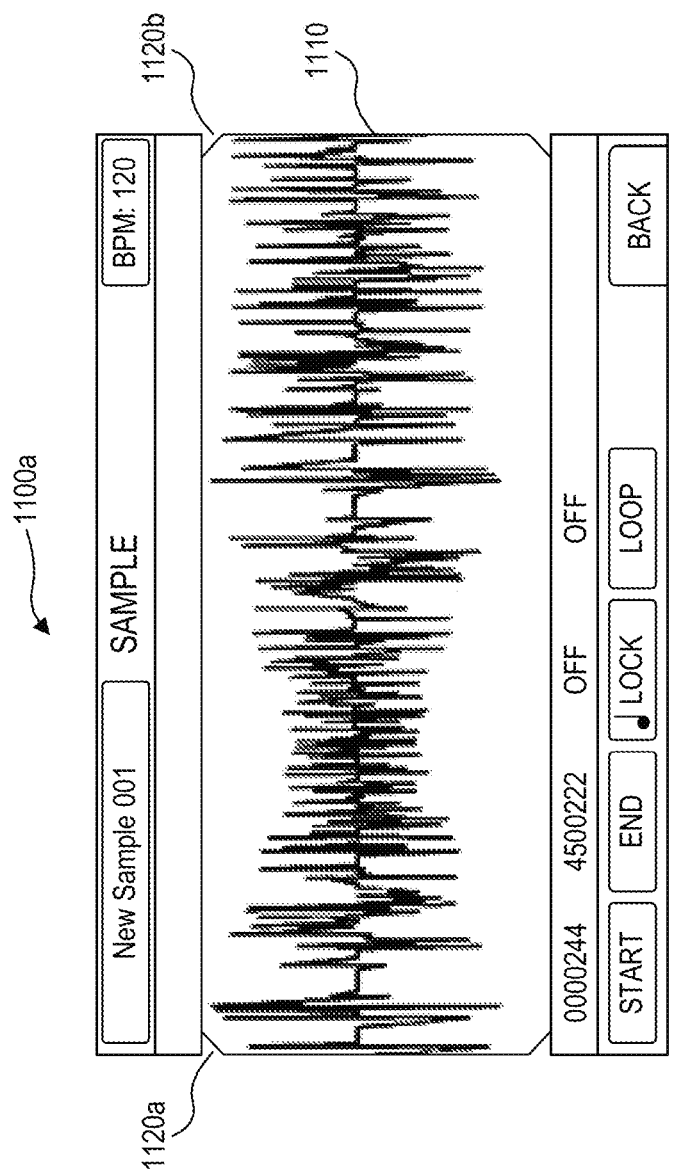
FIGS. 11A and 11B illustrate another exemplary display.
Figure 11B:
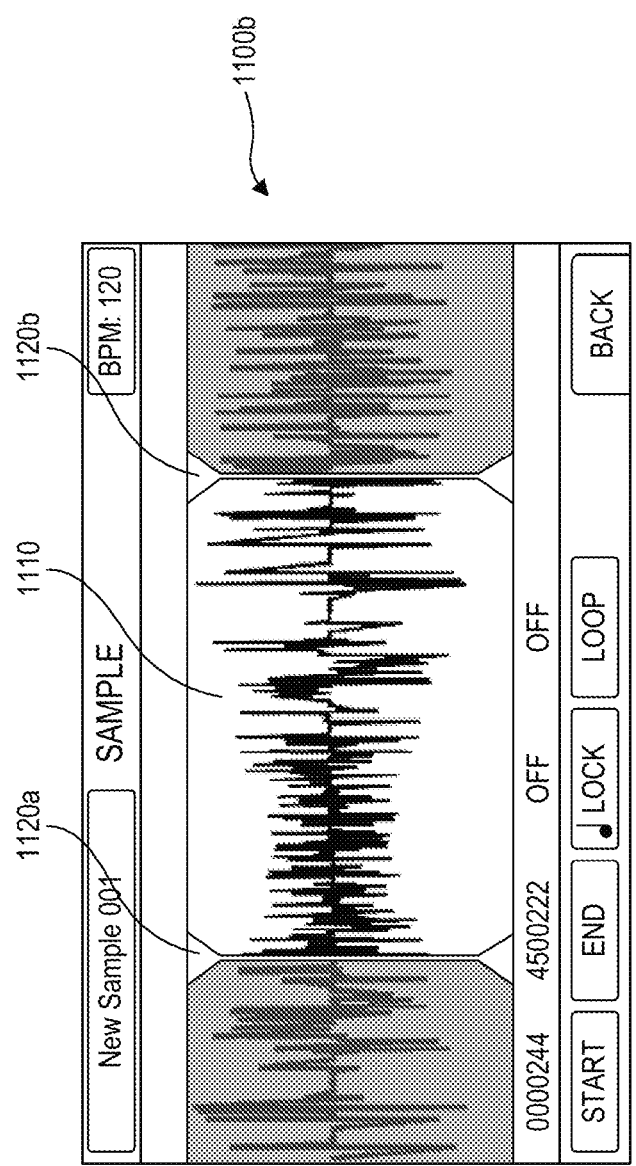

A user may press a record button, such as exemplary record-button 123 illustrated in FIG. 1, to initiate a process for recording a sample. A user may connect an external audio source to module 100 via, for example, exemplary Aux-In jack 205 illustrated in FIG. 2. Audio transmitted from the audio source may be recorded by module 100 and assigned as a sample to an instrument in kit 400 of FIG. 4. While recording, the user may be presented with an exemplary display 1000 and input-level monitoring meters 1010a and 1010b illustrated in FIG. 10. The user be presented with exemplary display 1100a, illustrated in FIG. 11A, to edit a recorded sample. Exemplary display 1100a may include a waveform representation of the recorded sample's audio signal, such as exemplary waveform representation 1110. The user may adjust the start time and stop time of the portion of the recorded sound to be played back within the sample. The start time and stop time may be set by adjusting the positions of locators 1120a and/or 1120b. For example, the position of locator 1120a may indicate where sample playback will start and the position of locator 1120b may indicate where sample playback will end. The user may adjust the positions of locators 1120a and/or 1120b by rotation of wheel 103. When locators 1120a and/or 1120b are moved in certain embodiments, the waveform representation 1110 that is between the two locators (e.g., the portion of the sample that will be assigned to a drum pad) may be displayed brighter than the portions of the waveform representation 1110 to the left of locator 1120a and/or to the right of locator 1020b. Such visualization is illustrated as the exemplary display 1100b in FIG. 11B. This may be achieved by dimming portions of waveform representation 1110 and/or highlighting portions of waveform representation 1110. Such visual representation of the selected portion of waveform representation 1110 may provide a user with an additional indicator of which portion of waveform representation 1110 was selected (i.e., the portion highlighted). This indication may be provided in addition to or instead of the positions of locators 1120a and 1120b. Adjusting the positions of locators 1120a and 1120b with a wheel rather than a computer keyboard may be more convenient for a musician because standard computer keyboard's layout may have relatively many buttons that are small compared to the size of the wheel. Adjusting the positions of locators with a wheel rather than a computer mouse may be more convenient for a musician because the standard computer mouse, which operates mostly in vertical and horizontal motions, may offer little resistance to accidental movement, whereas wheel 103 may have an internal resistance built in (e.g., friction) such that rotating wheel 103 requires an application of enough force so that the chance of accidental rotation is reduced. Use of wheel 103 may facilitate faster and more intuitive use by musicians in high-energy performance settings that may, in some circumstances, have poor lighting conditions. Wheel 103 may allow for more precise control of locator's 1120a and/or 1120b position and, therefore, more precise placement within the exemplary display 1100b than buttons allow because a button-press may generate an instruction to move a locator by a fixed discrete amount when pressed, whereas wheel 103 may allow for movement by any amount when rotated. This may, among other things, permit faster movement of locators 1120a and 1120b to the desired positions. It may be beneficial for a musician to use wheel 103 to make these adjustments directly on module 100 instead of a computer because, for example, module 100 may be manufactured with an interface for connecting to one or more electronic-drum pads whereas computers are typically manufactured without such interface. Allowing a user to have electronic-drum pads connected to the unit on which the drum samples will be played, such as module 100, may allow the user to edit a recorded sample and start triggering it with the electronic-drum pads in less time and in fewer steps than if the user were required to first record and edit the sample on a computer and then transfer it to the unit that will be connected to the electronic-drum pads. Facilitating the recording and editing of the sample on module 100 instead of a on computer may decrease the number of devices needed by a musician, reducing transportation, storage, and capital-investment expenses in equipment. For example, module 100 may be a single self-contained unit, whereas a computer system for recording and editing the sample may comprise multiple units (e.g., computer case, display monitor, keyboard, mouse, and/or speakers). If a computer system for recording and editing a sample is used, the sample may then need to be transferred to a module for, among other things, interfacing with the electronic-drum pads, which may require two or more pieces of equipment (e.g., the computer system and the module), extra time, and, potentially, system resources to transfer the sample. In some embodiments. the start-time and stop-time may be set using one or more methods other than adjusting the position location markers. For example, a user may enter the start and stop time using a keypad and/or select a range of time by scrolling wheel 103. In certain embodiments, recorded and/or edited samples may be stored on internal storage of module 100, such as an SD Card, flash memory, or RAM, and/or on external memory such as a hard drive.

Figure 12A:
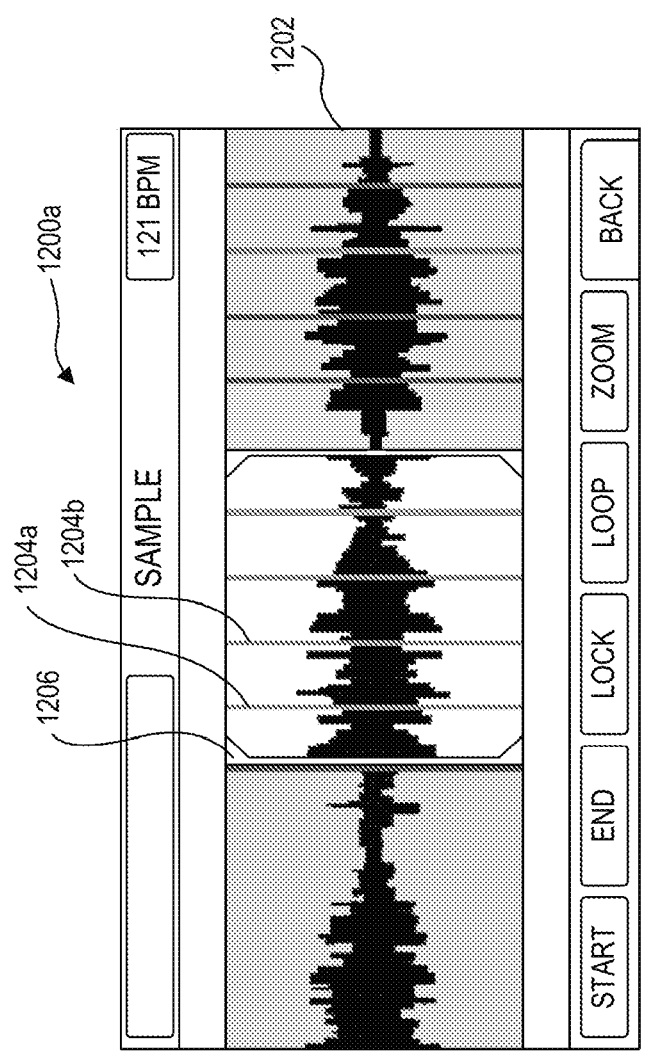
FIGS. 12A and 12B illustrate another exemplary display.
Figure 12B:
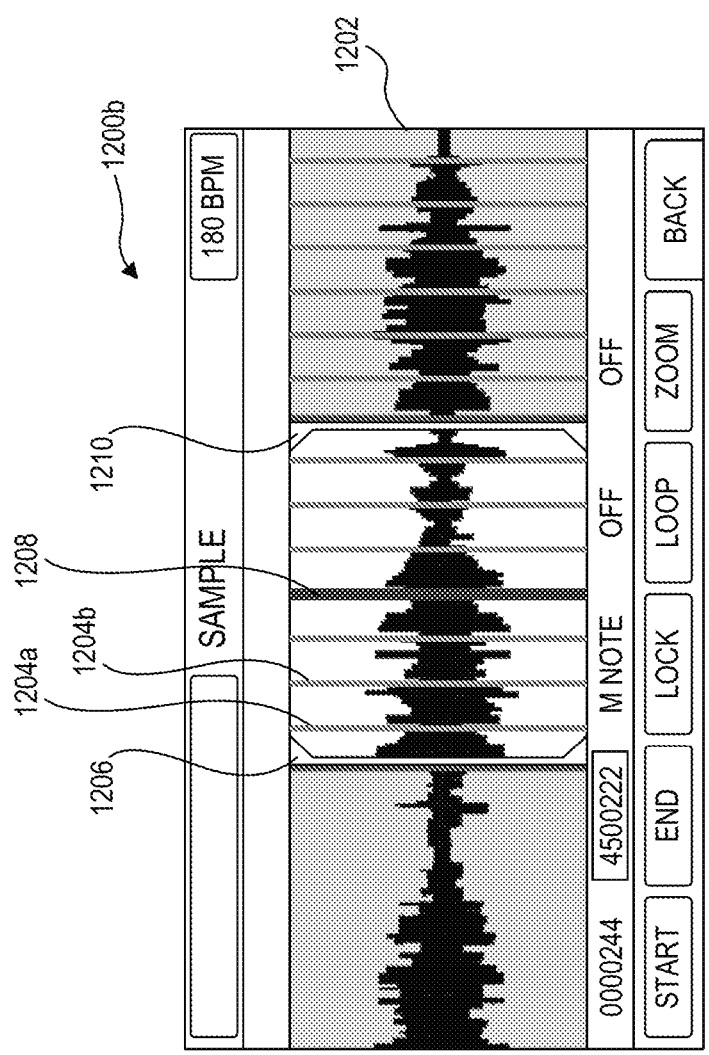

In certain embodiments, a user may overlay a tempo grid over a waveform representation of a recorded sample. FIGS. 12A and 12B illustrate exemplary displays 1200a and 1200b, respectively, for overlaying a tempo grid over a waveform representation 1202. The display make have gridlines indicating a temporal unit (e.g., a quarter note, an eighth note, etc.), such as gridlines 1204a and 1204b overlaid over waveform representation 1202. In certain embodiments, the position of a left locator 1206 may be used to set the location of the downbeat or another temporal location. In certain embodiments, module 100 may automatically determine the tempo of the recorded sample and, therefore, the spacing between gridlines. This may be achieved using a tempo-detection algorithm. The user may edit the tempo and thereby change the spacing between gridlines 1204a and 1204b. The spacing between gridlines may be changed in real-time as the tempo is changed (e.g., the spacing may be changed every time a tempo control is actuated without requiring further interaction from a user). For example, at a certain tempo, the gridlines 1204a and 1204b in FIG. 12A may have a certain distance between them. If the user increases the tempo, gridlines 1204a and 1204b and move closer together, as in FIG. 12B. This visualization may permit a user to fine-tune the tempo based on the positions of gridlines with respect to the waveform representation 1202, allowing for a visual indication of when the tempo is set correctly (e.g., when a subsequent quarter note's gridlines is overlaid over the beginning of bass-drum strike's waveform). The tempo may be changed by, for example, rotating wheel 103 of FIG. 1 and/or using another control. Once the gridlines have been overlaid over waveform representation 1202, the gridlines may facilitate faster navigation to a particular section of the sample and/or faster selection of a portion of the sample. For example, once the gridlines are overlaid, rotating wheel 103 may cause a playback-location indicator such as exemplary playback-location indicator 1208 to jump to the preceding or subsequent gridline rather than move a fixed number of ticks, milliseconds, etc. In certain embodiments, rotating wheel 103 changes which portion of the sample is selected. For example, if the gridlines are spaced with a quarter-note width, rotating wheel 103 may select the preceding or subsequent quarter-note-length region of the sample. In certain embodiments, rotating wheel 103 changes the position of locator 1206 and/or locator 1210 by the temporal unit indicated by the gridline spacing (e.g., moves locator 1206 and/or 1210 to the preceding or the next gridlines). Similar position adjustment may be performed on playback-location indicator 1208. Other temporal units, such as an eighth-note, may be used. In certain embodiments, once a grid, such as a quarter-note grid, is created, a finer grid (e.g., a sixteenth-note grid) may be displayed. In certain embodiments, the region selected may be highlighted. Selected regions may be saved, played, played in a looped manner, and/or assigned as samples to a drum pad. In some embodiments, one or more processor may perform digital signal processing on the recorded sample (e.g., time-compressing or stretching the recorded sample) while one or more other processors handle other tasks (e.g., generating a waveform for displaying a time-compressed or stretched recorded sample waveform).

Figure 13:
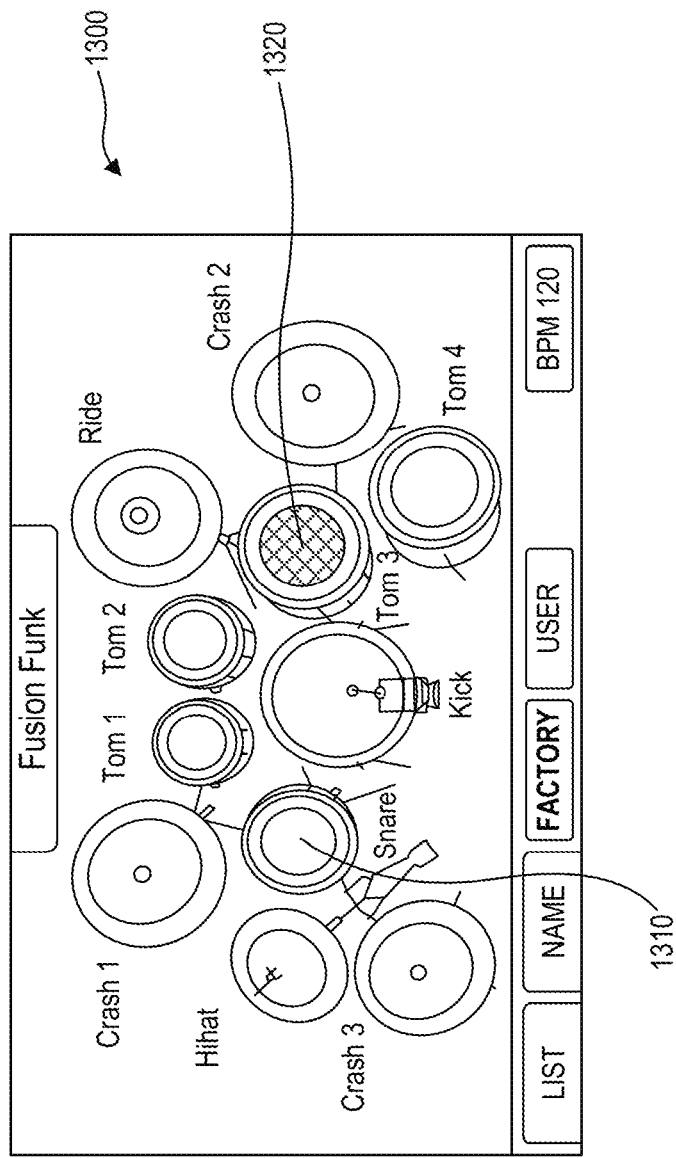
FIG. 13 illustrates another exemplary display.

Module 100 may indicate to a user the relative force with which the user strikes a drum zone. A user may wish to see such indication when, for example, setting a trigger threshold (e.g., the minimum amount force required for the module to play a sound) or a gain value (e.g., decreasing or increasing the volume at which a sound will play when triggered with a strike with a certain force) because it may assist them in visualizing how hard they are striking the drum pad. A user may also wish to see such force indicator when practicing making strikes with equal force. An indication of a strike's force may be indicated on display 101 with exemplary display 1300 as illustrated in FIG. 13. Display 1300 may show at least one available drum pad, such as a snare-drum pad 1310. When a user strikes a drum pad, such as a third tom-tom drum pad 1320 in a set of four tom-tom drum pads, the color of the displayed third tom-tom drum pad 1320 may change. The new color of the third tom-tom drum pad 1320 may correspond to the intensity with which it was struck. For example, in certain embodiments, the color of the third tom-tom drum pad 1320 may be blue when it is not being struck, red when it is struck with a maximum force the sensors may sense, and some other color or colors when struck with some force between the two aforementioned forces. One of the colors used for the third tom-tom drum pad 1320 may be, for example, a black color. In an embodiment, the color displayed when the drum pad is struck may be a different tint, tone, or shade of the color displayed when the drum pad is not struck. In an embodiment, the color displayed when the drum pad is struck may be a different hue than the color displayed when the drum pad is not struck. For example, the color of the drum pad may have a color gradient from one color to another across the drum pad (e.g., from the center to the edge). In some embodiments, a certain portion of the drum displayed may have its color changed. For example, if the user strikes the center or near the center of the drum pad, the displayed central section of the drum pad may change color. If the user strikes the rim of a drum pad, the displayed rim of the drum pad may change color. Such method of displaying drum-strike velocity information may be preferred to only displaying a number whose value is associated with a velocity and/or displaying a bar whose height is associated with a velocity. This may be so because showing a visual representation of the object being struck as changing colors may help create an association, subconscious or otherwise, in the mind of the user between the object and the strike velocity, allowing for a more intuitive user experience interfacing with module 100 than without this association. For example, the fact that the user is seeing the relevant information as a single object (e.g., the struck drum-head changing colors) may provide a more intuitive user experience than if the relevant information is distributed among multiple objects (e.g., an image or name of the struck drum-head as one object and a number or bar as a second object). In addition to helping create an association between the pieces of information, the user may be aided by allowing fewer items to be displayed at a single time on display 101 but still providing the relevant information. This may offer the advantage of fewer distractions to the user from the relevant information or create room for displaying more types of information to the user (e.g., information not related to the strike velocity of a particular drum). The foregoing method of displaying a strike velocity may be performed on module 100 and/or on a general-purpose computer.

Figure 14:
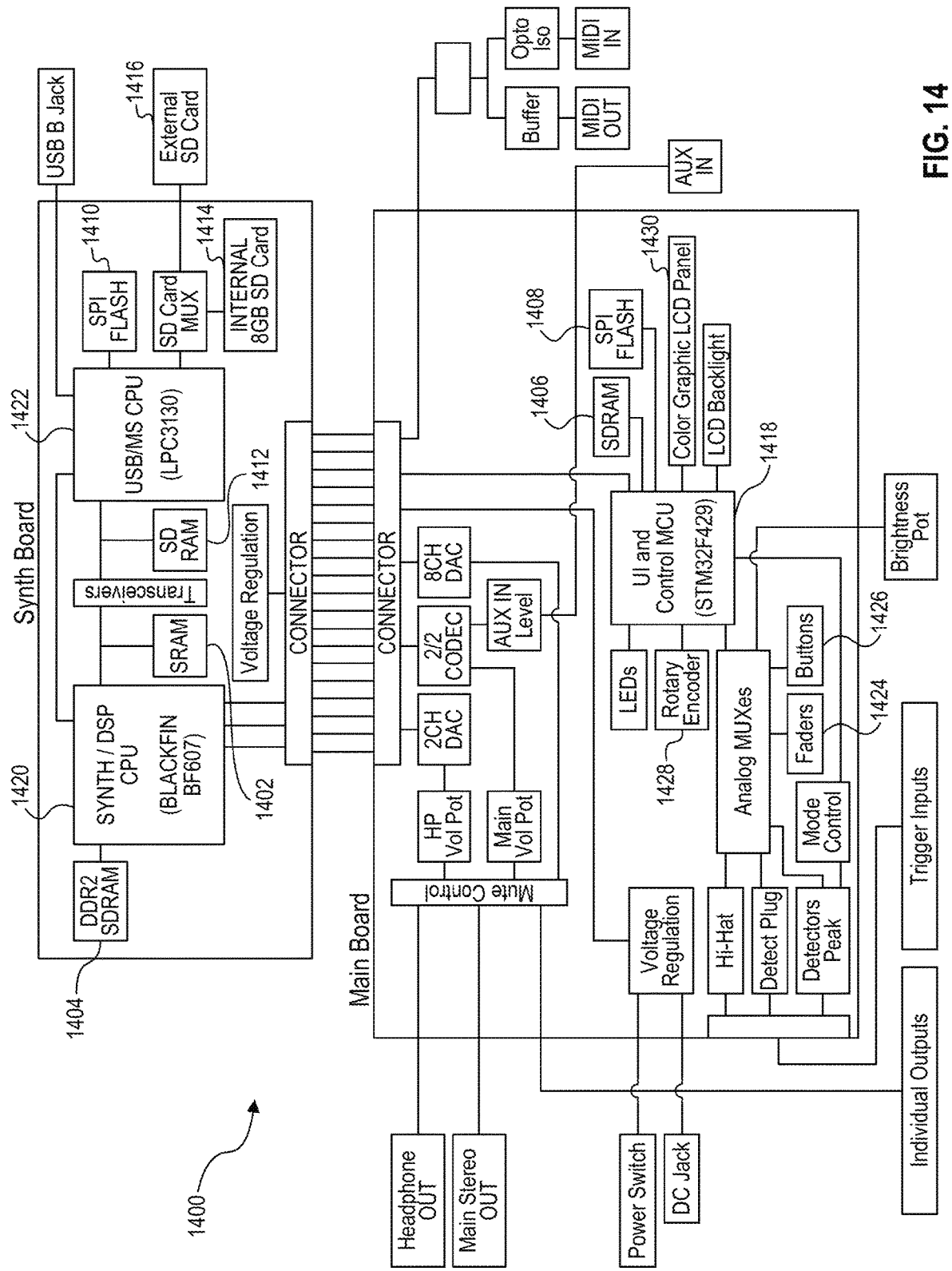
FIG. 14 illustrates an exemplary system.

An exemplary system for implementing module 100 is illustrated in FIG. 14 as exemplary system 1400. The various components of system 1400 may include an assembly of hardware, software, and/or firmware, including one or more memory devices (e.g., SRAM 1402, DDR2 SDRAM 1404, SDRAM 1406, SPI Flash 1408, SPI Flash 1410; SDRAM 1412; internal SD Card 1414; external SD Card 1416; internal memory on MCU 1418; internal memory on DSP CPU 1420; and/or internal memory on USB/MS CPU 1422) one or more central processing units ("CPU") (e.g., MCU 1418; DSP CPU 1420; and/or USB/MS CPU 1422), and/or one or more optional user interface units ("I/O Units") (e.g., faders 1424, rotary encoder/wheel 1428, and/or buttons 1426). Memory devices may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPUs may include one or more processors for processing data according to a set of programmable instructions or software stored in the memory devices. The functions of one or more processors may be provided by a single dedicated processor or by a plurality of such processors. Moreover, the one or more processors may include, without limitation, digital signal processor (DSP) hardware, or any other hardware capable of executing software. The optional user interface units may comprise any type or combination of input/output devices, such as a display monitor/color graphic LCD Panel 1430, keyboard, touch screen, wheel, and/or mouse.

Certain embodiments of the present disclosure may be implemented as software on a general purpose computer.

Figure 15:
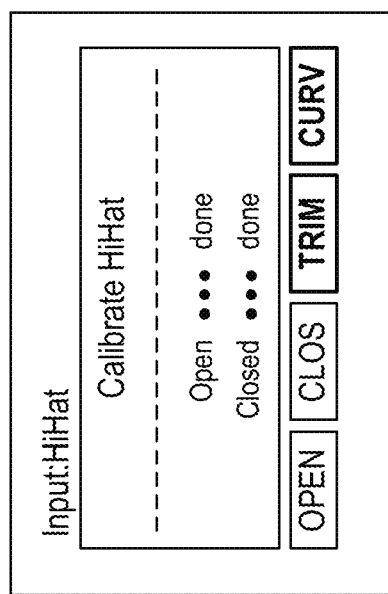
FIG. 15 illustrates another exemplary display.
Figure 16:
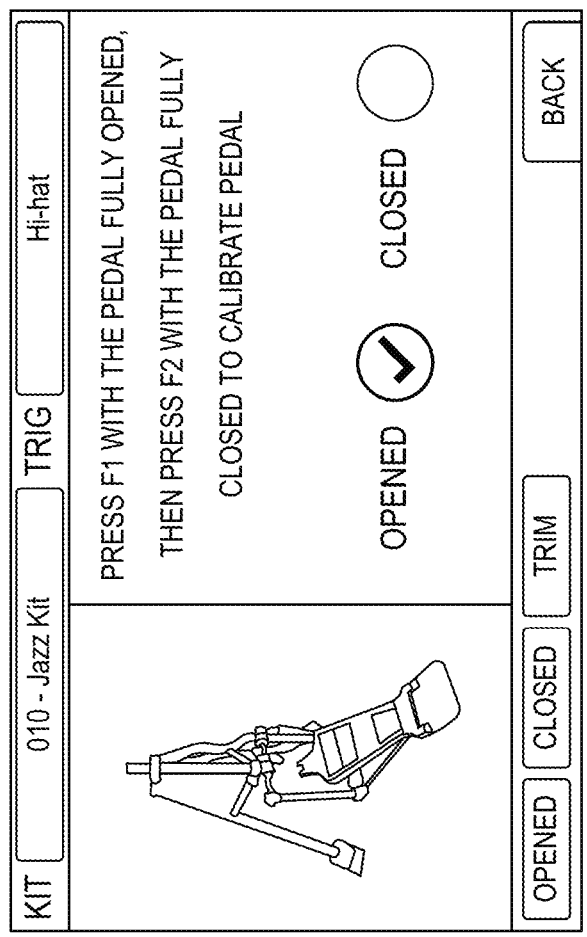
FIG. 16 illustrates another exemplary display.

FIG. 15 is an illustration of a display without a visualization of the vertical location of a high-hat pedal (e.g., how pressed or depressed the high-hat pedal is). This may be in contrast to FIG. 16, which is an exemplary display of a high-hat pedal that may indicate the vertical location of a high-hat pedal.

Figure 17:
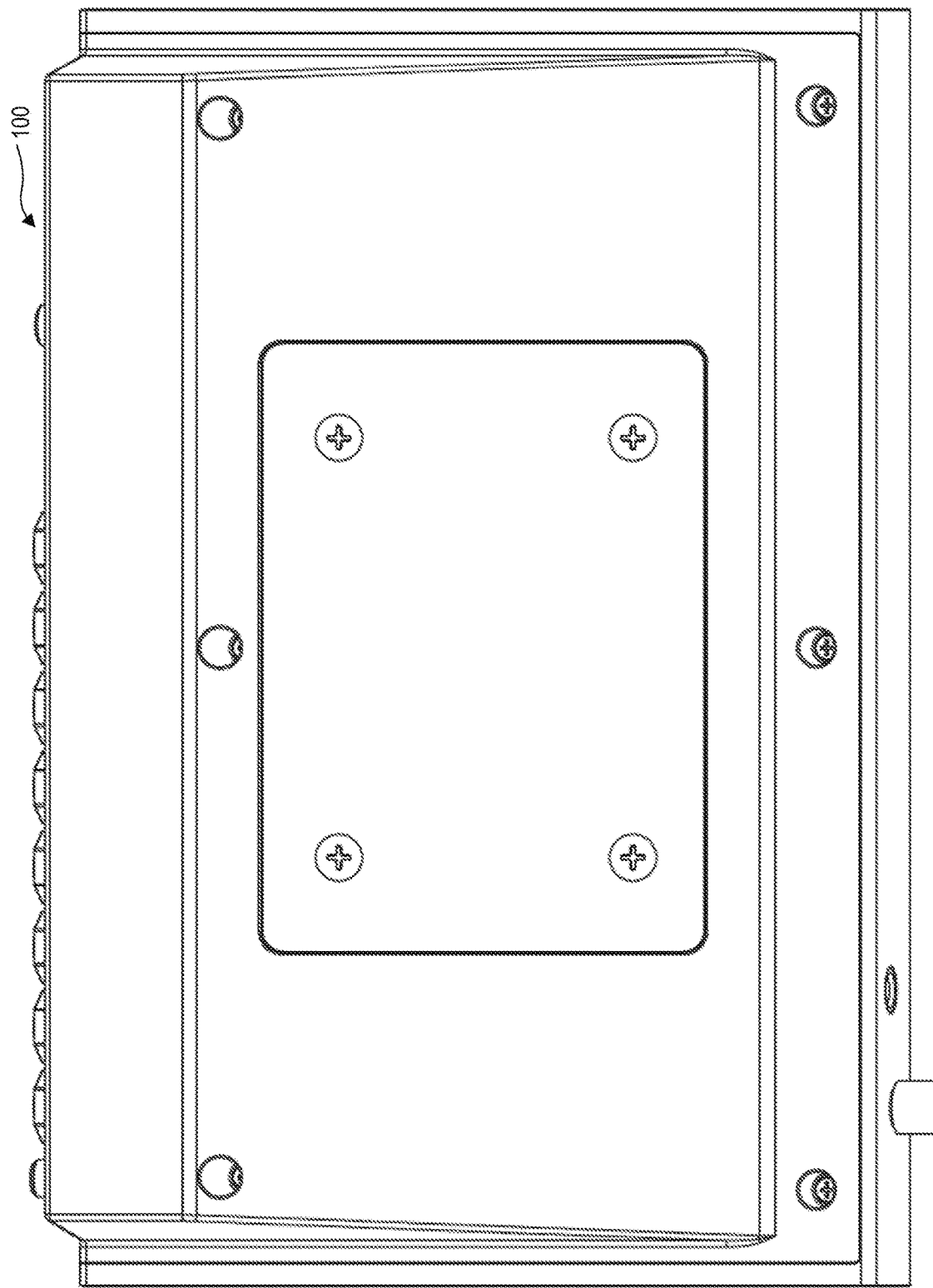
FIGS. 17-19 illustrate exemplary more views of the electronic-drum module.
Figure 18:
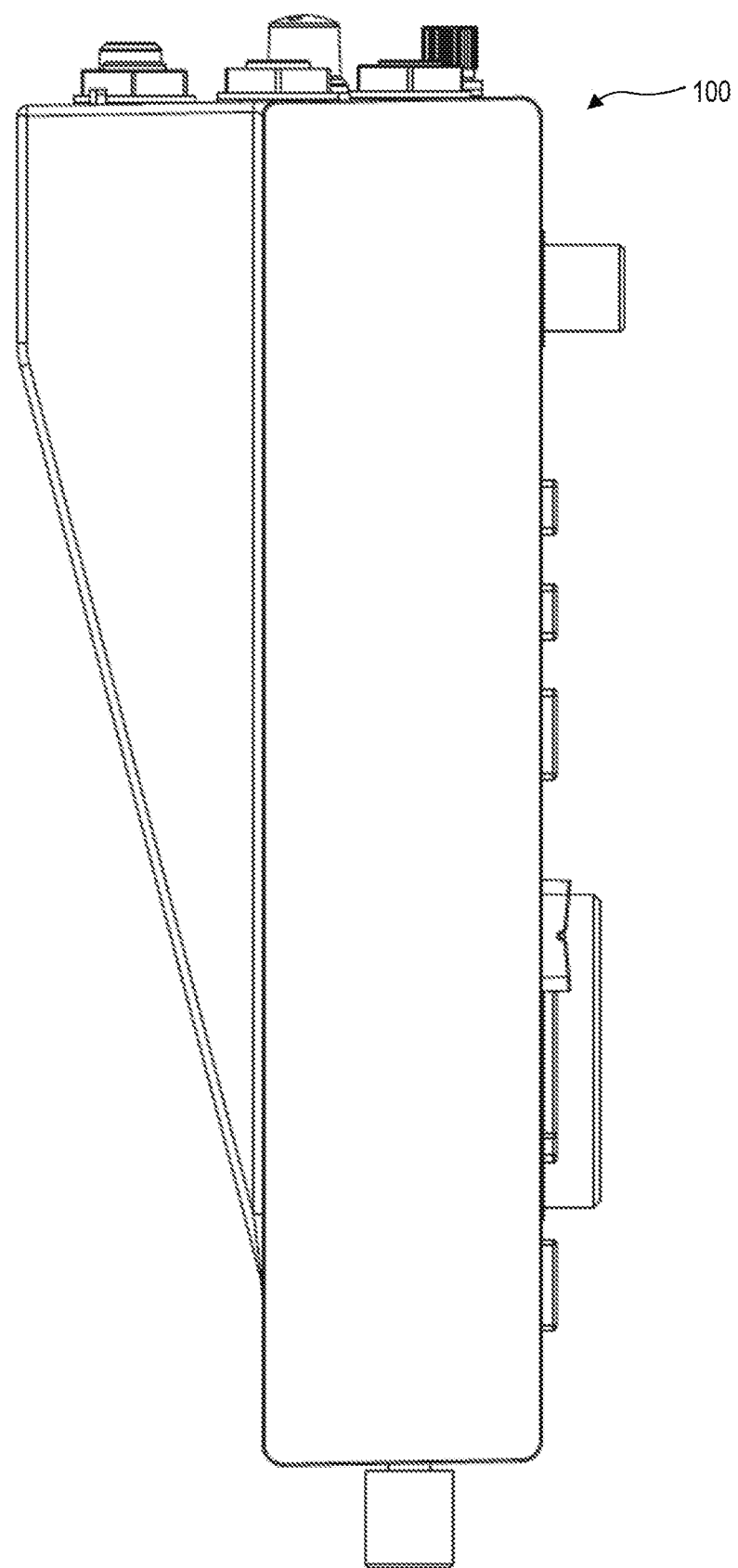
Figure 19:
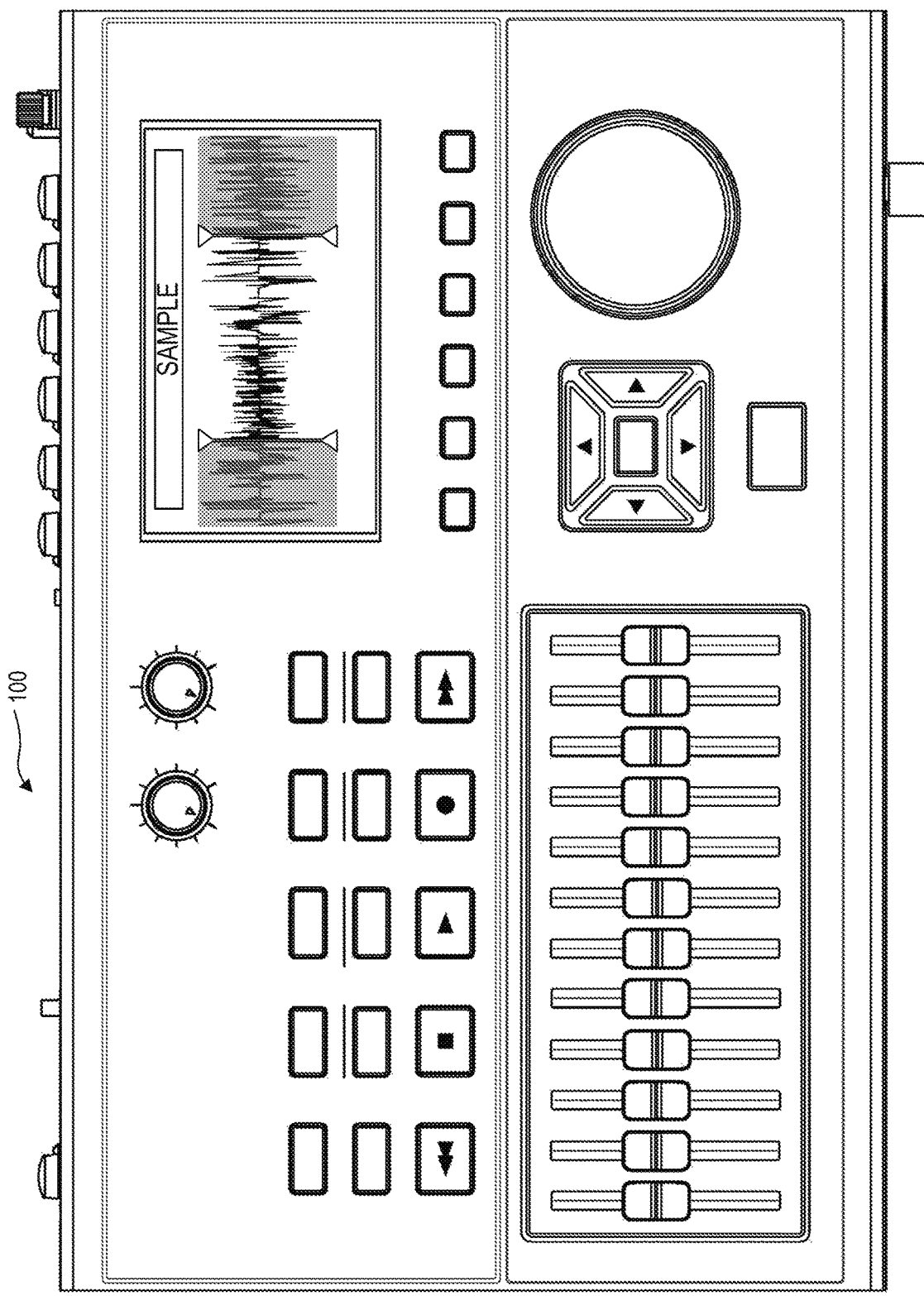

FIGS. 17-19 are exemplary views of module 100.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Computer programs, program modules, and code based on the written description of this specification, such as those used by the microcontrollers, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

Another aspect of the disclosure is directed to a non-transitory computer-readable medium storing instructions which, when executed, cause one or more processors to perform the methods of the disclosure. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An electronic-drum module for connection to one or more trigger sources, the electronic-drum module comprising:
    an electronic display;
    a memory storing one or more audio files for playback when the playback is triggered by a signal received from the one or more trigger sources, the one or more audio files grouped together into one or more drum kits; and
    one or more processors coupled to the electronic display and the memory, the one or more processors configured to:
        play the one or more audio files when the playback is triggered by the signal received from the one or more trigger sources;
        display, on the electronic display, a list of one or more available drum kits to associate with the at least one of the one or more available trigger sources; and
        in response to receiving selection data describing one of the available drum kits, display an image of the one drum kit, wherein the image contains details describing specific characteristics of the one drum kit, including any of relative size of drums in the one drum kit, number of cymbals available in the one drum kit, types of cymbals available in the one drum kit, type of wood comprising at least one drum in the one drum kit, or positions of drums or cymbals relative to each other in the one drum kit.

2. The electronic-drum module of claim 1, wherein the image of the one drum kit contains sufficient detail to visually discern the one drum kit from other drum kits.

3. The electronic-drum module of claim 1, wherein the image of the at least one of the one or more available drum kits is a custom image wherein each drum kit has a unique image associated therewith.

4. A non-transitory computer-readable medium storing instructions executable by an electronic-drum module comprising at least one processor, an electronic display, a memory storing audio files for playback when triggered by a trigger source, the one or more audio files grouped together into one or more drum kits, the instructions executable to facilitate a method comprising:
    displaying, on the electronic display, a list of one or more available drum kits to associate with the at least one of the one or more available trigger sources; and
    in response to receiving selection data describing one of the available drum kits, displaying an image of the one drum kit, wherein the image contains details describing specific characteristics of the one drum kit, including any of relative size of drums in the one drum kit, number of cymbals available in the one drum kit, types of cymbals available in the one drum kit, the type of wood comprising at least one drum in the one drum kit, or positions of drums or cymbals relative to each other in the one drum kit.

5. The method of claim 4, wherein the image of the one drum kit contains sufficient detail to visually discern the one drum kit from other drum kits.

6. The method of claim 4, wherein the image of the at least one of the one or more available drum kits is a custom image wherein each drum kit has a unique image associated therewith.

7. A method for use with an electronic-drum module comprising at least one processor, an electronic display, a memory storing audio files for playback when triggered by a trigger source, the one or more audio files grouped together into one or more drum kits, the method comprising:
    displaying, on the electronic display, a list of one or more available drum kits to associate with the at least one of the one or more available trigger sources; and
    in response to receiving selection data describing one of the available drum kits, displaying an image of the one drum kit, wherein the image contains details describing specific characteristics of the one drum kit, including any of relative size of drums in the one drum kit, number of cymbals available in the one drum kit, types of cymbals available in the one drum kit, the type of wood comprising at least one drum in the one drum kit, or positions of drums or cymbals relative to each other in the one drum kit.

8. The method of claim 7, wherein the image of the one drum kit contains sufficient detail to visually discern the one drum kit from other drum kits.

9. The method of claim 7, wherein the image of the at least one of the one or more available drum kits is a custom image wherein each drum kit has a unique image associated therewith.

* * * * *